US010802260B2

(12) United States Patent
Quarre et al.

(10) Patent No.: US 10,802,260 B2
(45) Date of Patent: Oct. 13, 2020

(54) AUTOMATED SUBSTRATE LOADING

(71) Applicant: RareCyte, Inc., Seattle, WA (US)

(72) Inventors: Steve Quarre, Seattle, WA (US);
Edward Shafer, Bellevue, WA (US);
David Stewart, Seattle, WA (US); Joel Smith, Seattle, WA (US)

(73) Assignee: RareCyte, Inc., Seattle, WA (US)

(*) Notice: Subject to any disclaimer, the term of this patent is extended or adjusted under 35 U.S.C. 154(b) by 128 days.

(21) Appl. No.: 15/601,687

(22) Filed: May 22, 2017

(65) Prior Publication Data
US 2017/0363850 A1 Dec. 21, 2017

Related U.S. Application Data

(63) Continuation-in-part of application No. 14/718,381, filed on May 21, 2015, now Pat. No. 9,857,580.

(60) Provisional application No. 62/451,272, filed on Jan. 27, 2017, provisional application No. 62/004,417, filed on May 29, 2014.

(51) Int. Cl.
*G02B 21/26* (2006.01)
*G01N 21/01* (2006.01)
*G02B 21/24* (2006.01)
*G02B 21/34* (2006.01)

(52) U.S. Cl.
CPC ............. *G02B 21/26* (2013.01); *G01N 21/01* (2013.01); *G02B 21/24* (2013.01); *G02B 21/34* (2013.01); *G01N 2021/0106* (2013.01)

(58) Field of Classification Search
CPC ........ G02B 21/24; G02B 21/26; G02B 21/34; B01L 9/52; G01N 35/0002
See application file for complete search history.

(56) References Cited

U.S. PATENT DOCUMENTS

| 4,012,112 A * | 3/1977 | Masterson ............. G02B 21/26 359/393 |
| 5,659,421 A | 8/1997 | Rahmel et al. |
| 5,779,203 A * | 7/1998 | Edlinger ........... H01L 21/67775 248/178.1 |
| 6,395,554 B1 | 5/2002 | Regan et al. |
| 7,403,330 B2 | 7/2008 | Henderson et al. |
| 7,948,676 B2 | 5/2011 | Virag et al. |
| 8,593,730 B2 | 11/2013 | Yamamoto et al. |
| 8,902,501 B2 | 12/2014 | Suzuki et al. |
| 2005/0281661 A1 | 12/2005 | Kesil et al. |
| 2006/0033894 A1 | 2/2006 | Binnard |
| 2006/0164611 A1* | 7/2006 | Scampini ......... G01N 35/00029 353/103 |
| 2007/0147979 A1 | 6/2007 | Rice et al. |
| 2008/0266560 A1 | 10/2008 | Kok |
| 2009/0091149 A1 | 4/2009 | Chevassu et al. |

(Continued)

FOREIGN PATENT DOCUMENTS

JP 2013224850 A 10/2013
WO WO2015197742 A1 12/2015

*Primary Examiner* — William R Alexander
*Assistant Examiner* — Ephrem Z Mebrahtu
(74) *Attorney, Agent, or Firm* — Shay Glenn LLP

(57) ABSTRACT

This disclosure is directed to system for transferring a substrate, such as a microscope slide, and holding the substrate within at least one device. The system includes a holder for holding the substrate and a gripper for transferring the substrate, such as between a cassette or stack and the holder. A method is also discussed herein.

8 Claims, 22 Drawing Sheets

(56) References Cited

U.S. PATENT DOCUMENTS

| | | |
|---|---|---|
| 2009/0180090 A1 | 7/2009 | Hara |
| 2010/0040439 A1* | 2/2010 | Temple .................. G01N 1/312 |
| | | 414/222.01 |
| 2014/0362436 A1 | 12/2014 | Forget |
| 2015/0138632 A1 | 5/2015 | Mikhailov |
| 2015/0357213 A1* | 12/2015 | Yokoyama ........ H01L 21/67086 |
| | | 438/747 |
| 2016/0003065 A1* | 1/2016 | Stratton ................ C22C 19/058 |
| | | 416/241 R |

* cited by examiner

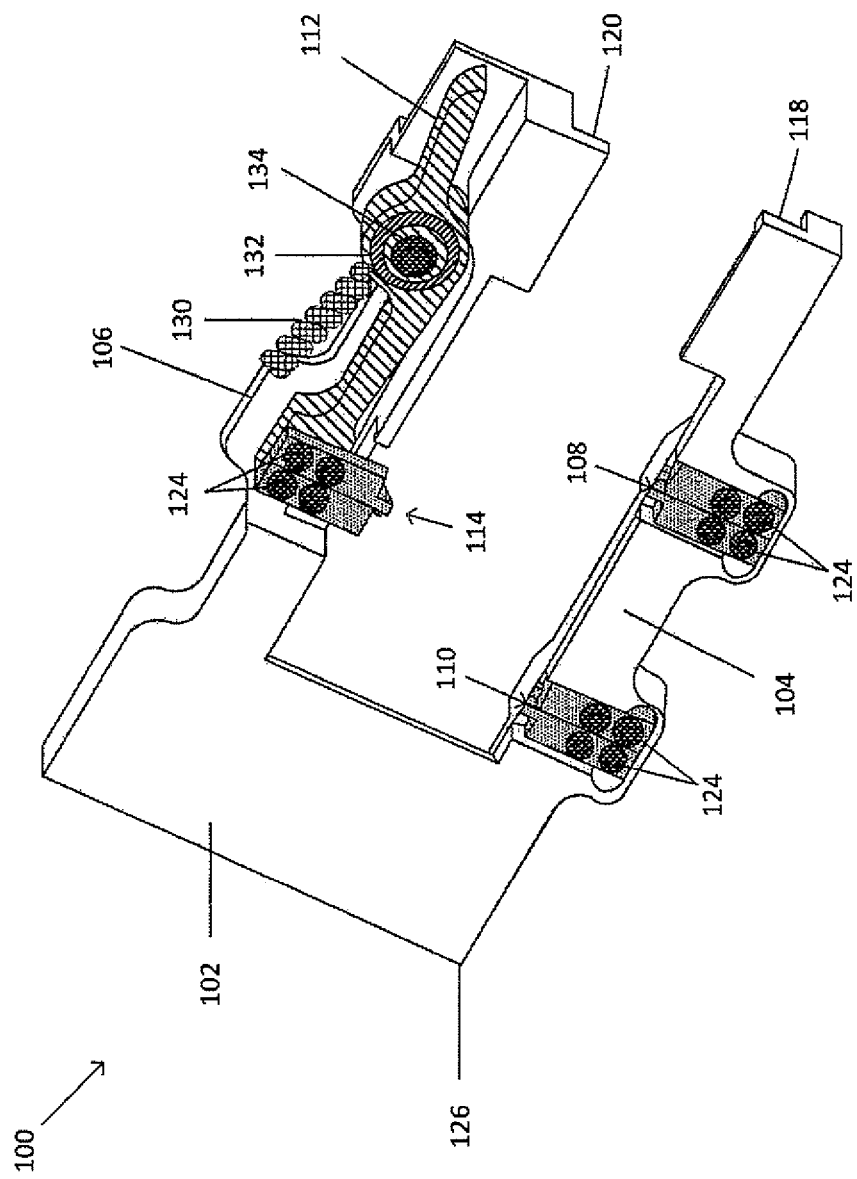

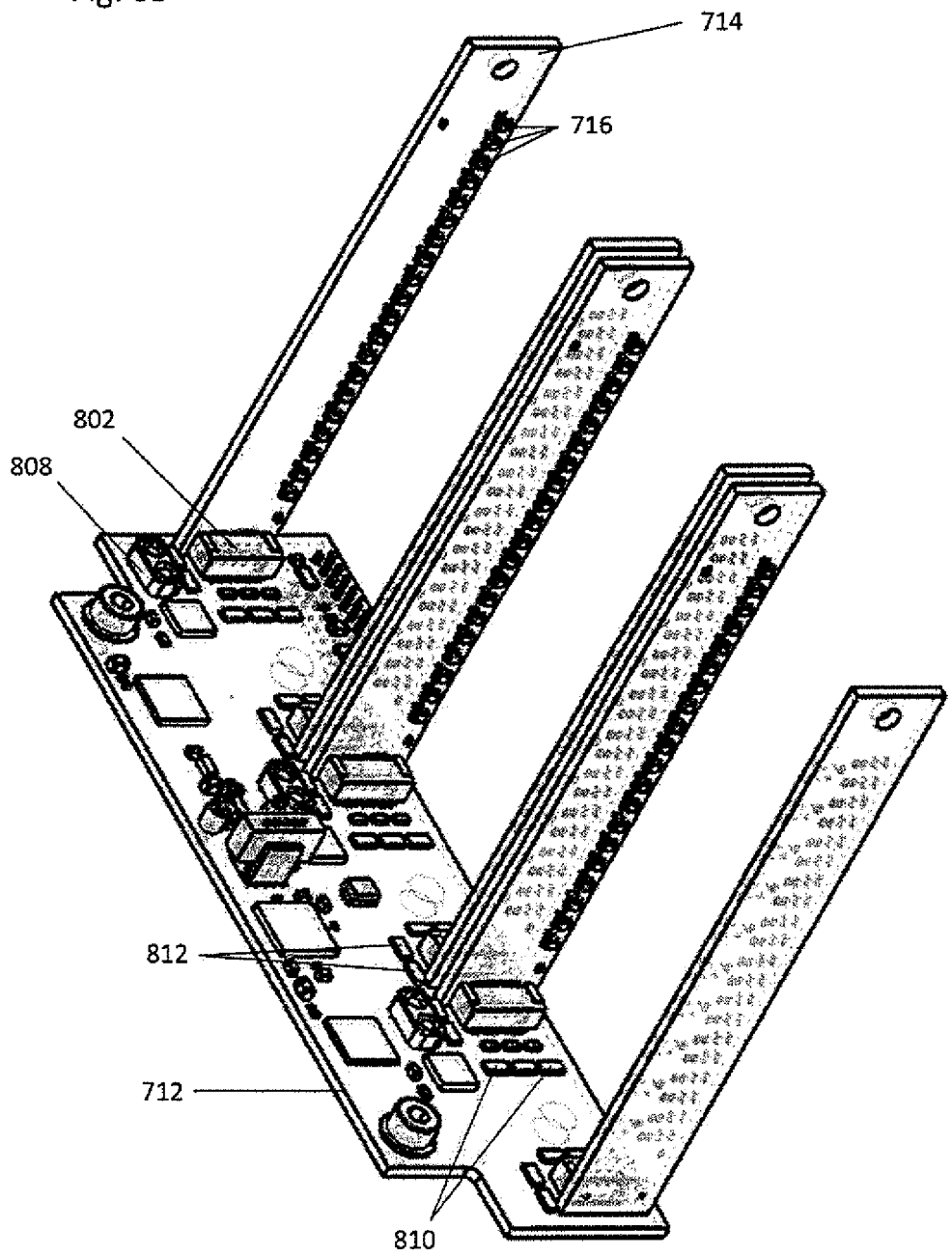

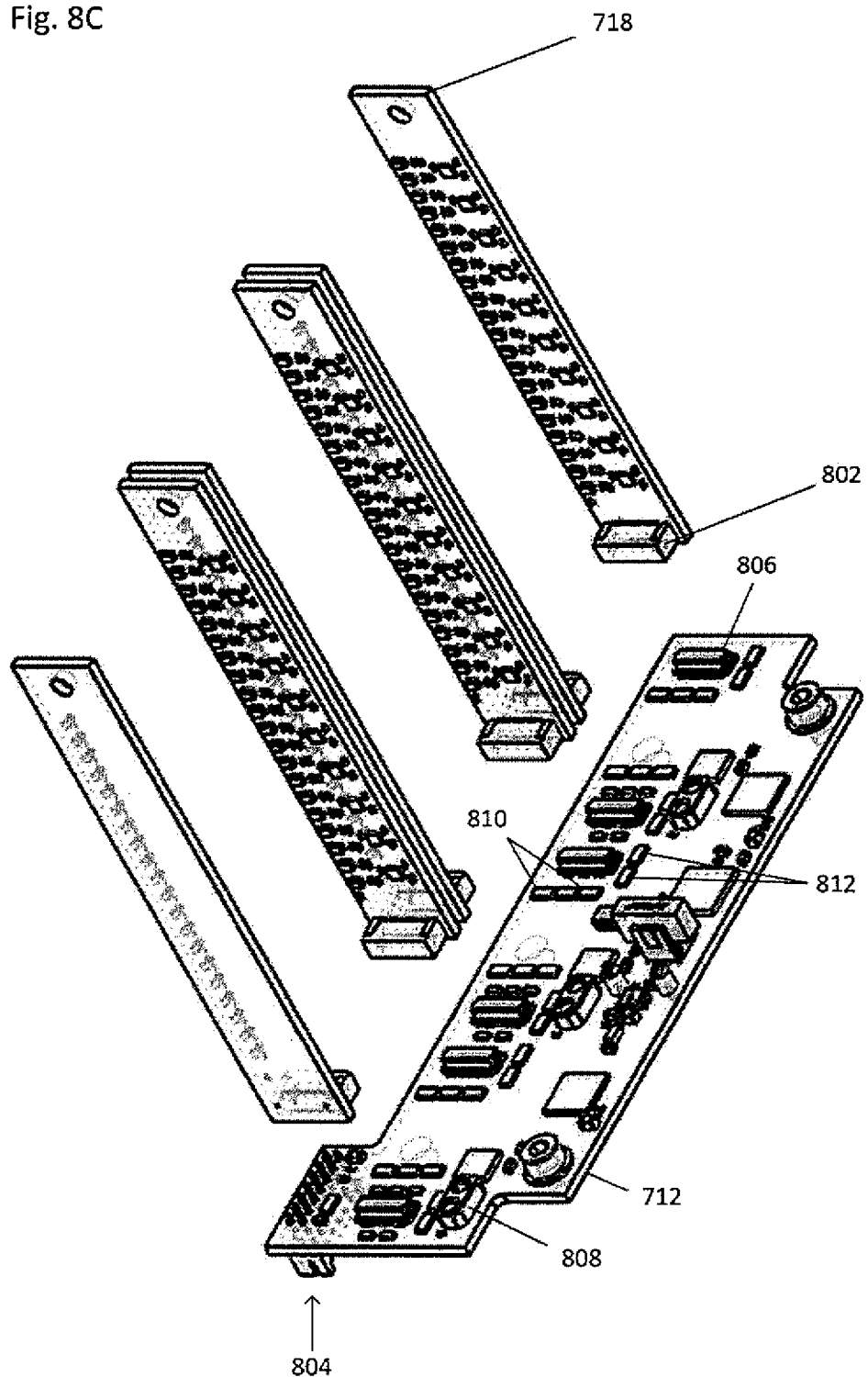

AUTOMATED SUBSTRATE LOADING

CROSS-REFERENCE TO A RELATED APPLICATION

This application claims the benefit of Provisional Application No. 62/451,272, filed Jan. 27, 2017, the benefit of Provisional Application No. 62/485,500, filed Apr. 14, 2017, and is a continuation-in-part of application Ser. No. 14/718,381, filed May 21, 2015, which claims the benefit of Provisional Application No. 62/004,417, filed May 29, 2014.

TECHNICAL FIELD

This disclosure relates generally to automated loading of a substrate and, in particular, to a system and method for loading the substrate.

BACKGROUND

Analysis of a biological sample includes the step of imaging the biological sample on a substrate, such as a microscope slide. To image, the substrate may be placed on a stage and the stage may be moved relative to an objective. Alternatively, the objective may be moved relative to the stage. However, when the substrate is not consistently secured in a repeatable, predictable manner regardless of substrate inconsistencies or deformities, the images which may vary from substrate to substrate and may be difficult to determine proper surface locations.

As a result, practitioners, researchers, and those imaging samples on substrates continue to seek an apparatus for consistently, repeatably, and predictably securing substrates of varying inconsistencies or deformities. The apparatus, by not deforming the surface or imparting moments on the substrate due to the kinematic nature, may accommodate a wide variety of substrates based on size, shape, and configuration.

DESCRIPTION OF THE DRAWINGS

FIGS. 1A-1C show an example holder.
FIGS. 8A-8D show an example controller system of the example cassette holder.

DETAILED DESCRIPTION

This disclosure is directed to system for transferring a substrate, such as a microscope slide, and holding the substrate within at least one device. The system includes a holder for holding the substrate and a gripper for transferring the substrate, such as between a cassette or stack and the holder. A method is also discussed herein.

A system and system components for automated loading of a substrate are discussed. For the sake of convenience, the system and system components are described with reference to a slide as an example substrate and a scanner as an example secondary device. The slide, for example, may include two long sides opposite one another and two short sides opposite one another and adjacent to each of the long sides. For the sake of convenience, a holder and a gripper, as discussed herein, hold and grip the long sides of the slide as related to securing blocks and securing brackets. The holder and gripper may hold or grip different sized and/or shaped substrates differently (e.g. locations or sides) based on various characteristics of the various substrates, when it is desirous, appropriate, and/or necessary to do so. Furthermore, and for the sake of convenience, any light and/or signal transmission, as discussed herein, may occur from long side to another long side. The light and/or signal transmission across different sized and/or shaped substrates may be implemented differently (e.g. locations or sides) based on various characteristics of the various substrates, when it is desirous, appropriate, and/or necessary to do so.

The system and system components described below, however, are not intended to be so limited in their scope of application. The system and system components may be used with any other kind of substrate including, but not limited to, a well plate, and any other appropriate secondary device including, but not limited to, a fluorescent microscope, a picking device, a scanner with a picking device, a fluorescent microscope with a picking device, or any imaging or processing machine.

Holder

Figure 1A:
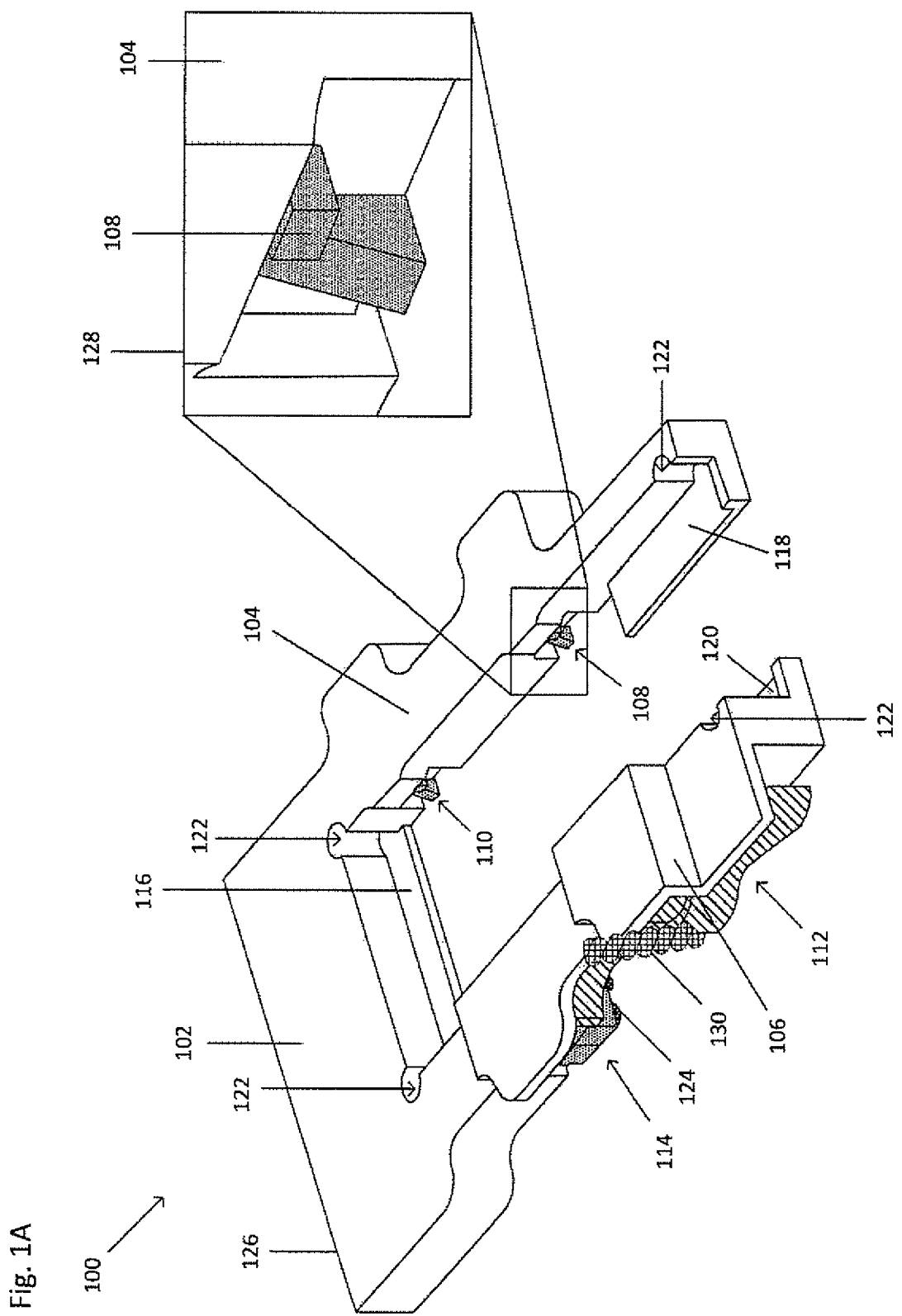
Figure 1B:
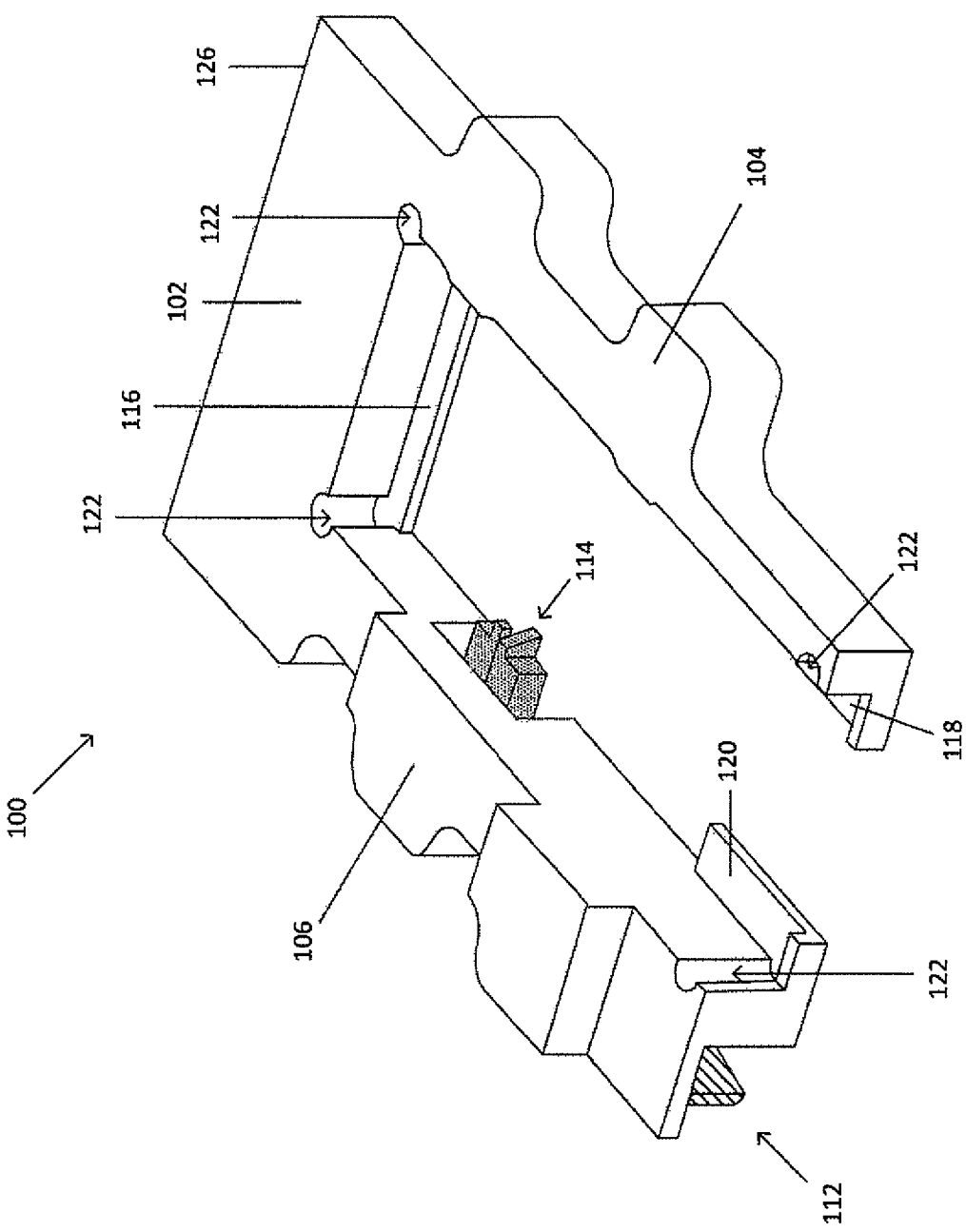

FIGS. 1A-1C shows isometric views of a holder 100 to securely hold a substrate, such as a microscope slide or a well plate. For the sake of convenience, the holder 100 is described with reference to a U-shape frame as an example frame. But the frame described below is not intended to be so limited in its scope of application. The frame, in practice, may be a four-walled frame (i.e. a main body with a cavity extending through the main body), J-shaped, or the like.

The holder 100 includes a frame 126 including a base 102, a first arm 104, and a second arm 106. The first arm 104 includes a proximal end connected to a first end of the base 102 and a distal end extending from the base 102. The second arm 106 includes a proximal end connected to a second end of the base 102 and a distal end extending from the base 102. The base 102 includes a base platform 116 extending in the same direction as the first and second arms 104 and 106 to support a portion of the substrate. The first aim 104 may include a first platform 118 at the distal end and extending toward the second arm 106 to support a portion of the substrate. The second arm 106 may include a second platform 120 at the distal end and extending toward the first arm 104 to support a portion of the substrate. The first and second platforms 118 and 120 may be adjoined, thereby forming a single platform and connecting the first and second arms 104 and 106 at the distal ends of the first and second arms 118 and 120. The base platform 116, the first platform 118, and the second platform 120 may be located on the same plane. Alternatively, the first and second platforms 118 and 120 may be located at any point between the distal and proximal ends of the first and second arms 104 and 106, respectively.

The first aim 104 also includes first and second securing blocks 108 and 110 to provide first and second points of contact, respectively, for the substrate during imaging, processing, holding, or the like. The first and second securing blocks 108 and 110 guide the substrate off of the platforms and constrain the substrate at the first and second contact points, respectively. Snapshot 128 shows a magnified view of the first securing block 108. The first and second securing blocks 108 and 110 may be attached to the first arm 104 by at least one fastener 124 (i.e. a screw, a nail, a peg, a pin, a nut and bolt, a dowel, a staple, a rivet, or the like), by an adhesive, by welding, or the like. Alternatively, the first and second securing blocks 108 and 110 and the first arm 104 may be formed as a single piece, such as by molding, machining, or the like.

The holder 100 also includes a secure bar 112 attached to the second arm 106 by a bearing 132 and a fastener 134. A third securing block 114, to provide a third point of contact for the substrate during imaging, processing, holding, or the like, may be attached to or may be formed as a part of the secure bar 112. The third securing block 114 guides the substrate off of the platforms and constrains the substrate at a third point. Furthermore, the three contact points imparted by the securing blocks 108, 110, and 114 provide for a kinematic mount—constraining a substrate in the x-, y-, and z-axes. The bearing 132 allows the secure bar 112 to move relative to the second arm 106 into open and closed positions. When in the open position, the secure bar 112 permits the substrate to freely slide into and out the holder 100; and when in the closed position, the third securing block 114 on the secure bar 112 and the first and second securing blocks 108 and 110 exert forces on the substrate to secure the substrate within the holder 100. A spring 130 may also be included and may extend from the secure bar 112 to the second arm 106 to pre-load the secure bar 112.

The holder 100 may also include cutouts 122 on an inner corner where the proximal ends of the first and second arms 104 and 106 meet the base 102. There may also be cutouts 122 at the distal ends of the first and second arms 104 and 106. The cutouts 122 permit for any appropriately sized substrate to be used since the corners of the substrate may fit within the cutouts 122 instead of breaking off or chipping when being placed into the holder 100. The holder 100 may be composed of ceramic, glass, plastic, metal, or combinations thereof.

The holder 100 may be attached to a secondary device for imaging and/or processing (i.e. a scanner, a fluorescent microscope, a picking device, a scanner with a picking device, a fluorescent microscope with a picking device, or any appropriate imaging or processing machine) by an attachment mechanism (i.e. a screw, a nail, a peg, a pin, a nut and bolt, a dowel, a staple, a rivet, or the like), by an adhesive, by welding, by clips, by detents, by tongue and groove joint, or the like. The holder 100 may include at least one hole to accommodate the attachment mechanism for proper, secure attachment to the secondary device.

Figure 2A:
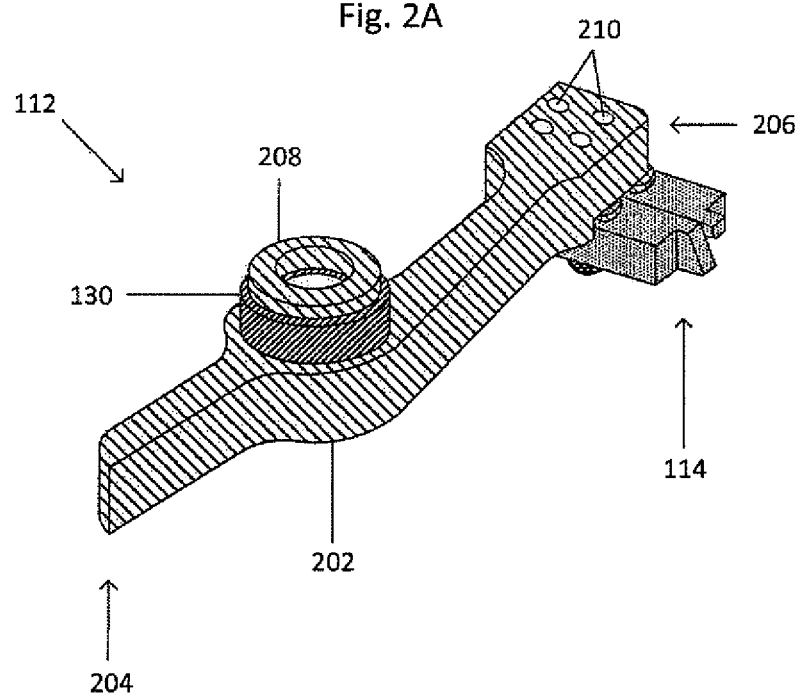
FIGS. 2A-2B show an example secure bar.
Figure 2B:
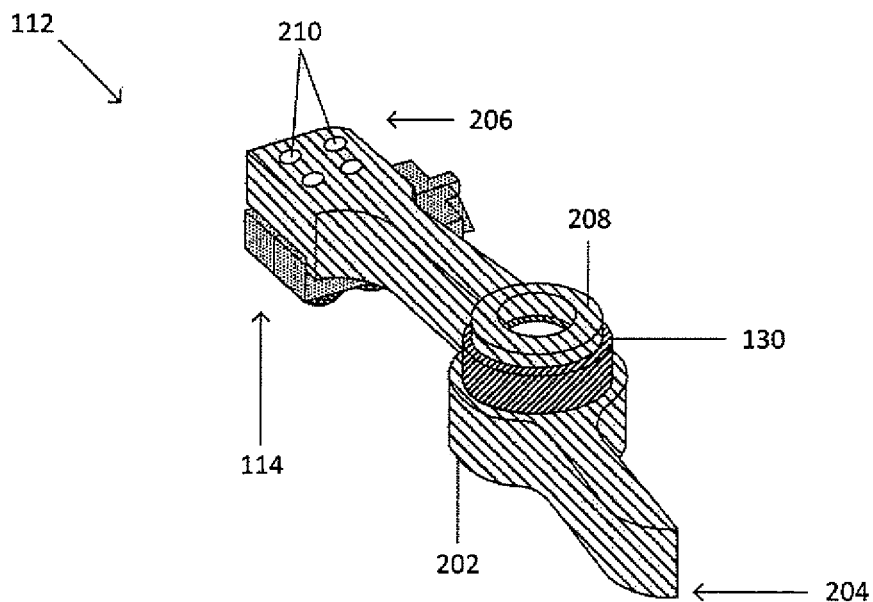

FIGS. 2A-2B show isometric views of the secure bar 112 with the third securing block 114 attached to the secure bar 112. The secure bar 112 includes a main body 202 having a first end 204 and a second end 206. The second end 206 may include at least one bore 210 extending at least partially through the second end 206 to accept the at least one fastener 124 to attach the third securing block 114 to the secure bar 112. The first end 204 includes a handle or grip to permit a force to be exerted on the main body 202 so as to move the secure bar 112 into the open and closed positions when it is desirous to do so. The secure bar 112 also includes the bearing 132 to move the main body 202 relative to the second arm (not shown) when exerting a force on the first end 204. Alternatively, the bearing 132 may be inserted into a cavity (not shown) in the second arm and the secure bar 112 may then be joined with the bearing 132 to allow for movement. The secure bar 112 may be moved into the open and closed positions when it is desirous to do so. The secure bar 112 may also include a Belleville spring 208 to pre-load to a bearing 128 and reduce movement of the bearing 128. The bearing 128 may be a single bearing or more than one bearing connected to allow for rotational movement.

Figure 3:
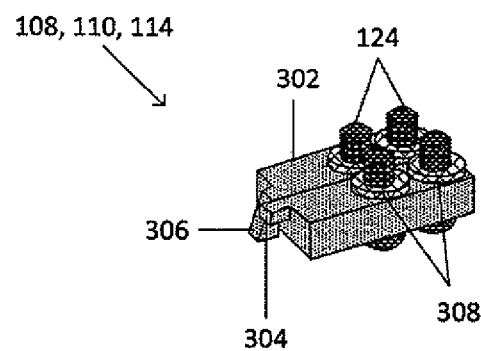
FIG. 3 shows an example securing block.

FIG. 3 shows an isometric view of the securing blocks 108, 110, and 114. The securing blocks 108, 110, and 114 provide a controlled references surface for the substrate during imaging, processing, holding, or the like. The securing blocks 108, 110, and 114 include a main body 302 with a stopper 304 and a ramp 306, both of which extend from the same side of the main body 302. When the secure bar (not shown) is moved into a closed position, the ramp 306 guides the substrate up and off of the platforms (not shown) and the stopper 304 sets a maximum lift distance and constrains the substrate. When the secure bar (not shown) is moved into an open position, the ramp 306 guides the substrate down and towards the platforms (not shown). The main body 302 may include at least one hole (not shown) to accept the at least one fastener 124 to attach to the holder (not shown). The main body 302 may be a single piece or may be two pieces. When the main body 302 is two pieces, a first piece includes the stopper 304 and a second piece includes the ramp 306. The securing blocks 108, 110, and 114 may also include at least one height adjuster 308, such as a shim, to adjust the heights of the securing blocks 108, 110, and 114 relative to the frame (not shown) of the holder (not shown).

The ramp 306 may be any appropriate shape, including, but not limited to, triangular, hemispherical, parabolic, trapezoidal, or the like.

Figure 4A:
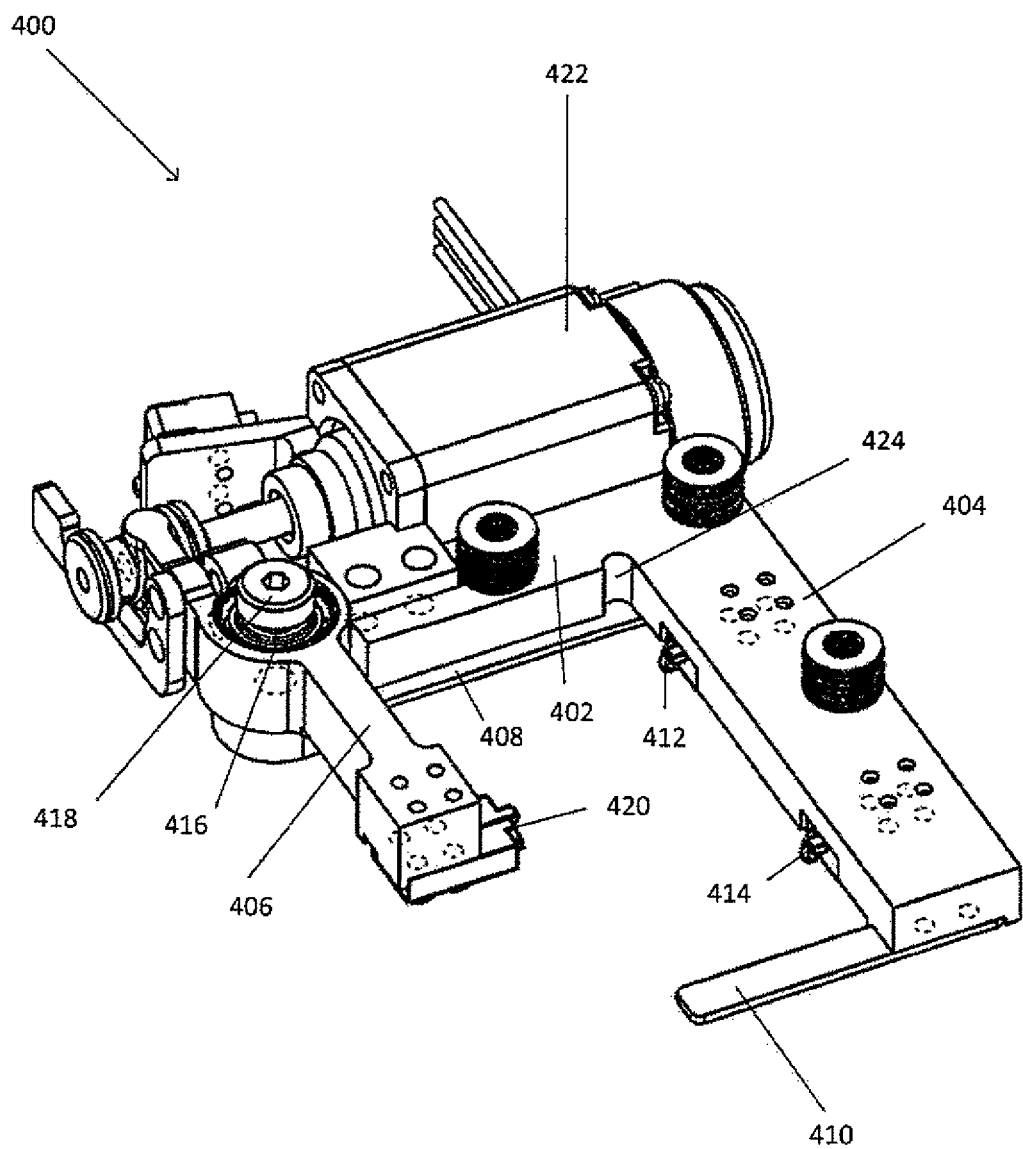
FIGS. 4A-4B show an example holder.
Figure 4B:
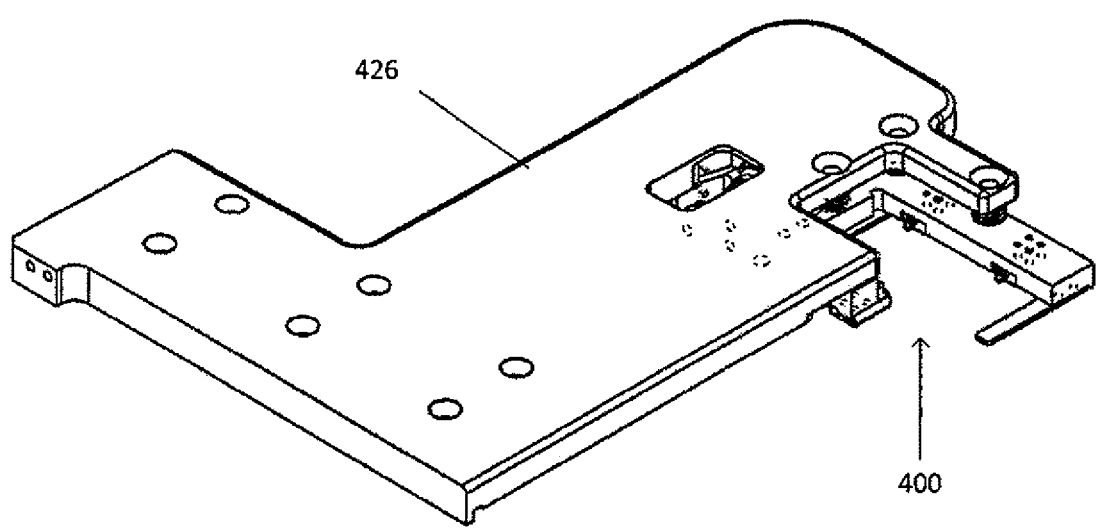

FIGS. 4A and 4B show an isometric view of a holder 400. The holder 400 is similar to the holder 100 except that the holder includes a bar motor 422 for automation.

The holder 400 includes a base 402, a first arm 404, and a secure bar 406. The first arm. 404 includes a proximal end connected to a first end of the base 402 and a distal end extending from the base 402. The secure bar 406 includes a proximal end connected to a second end of the base 402 and a distal end extending from the base 402. The base 402 includes a base platform 408 extending in the same direction as the first arm 404 and the secure bar 406 to support a portion of the substrate. The first arm 404 may include a first platform 410 at the distal end and extending toward the secure bar 406 to support a portion of the substrate.

The first arm 404 also includes first and second securing blocks 412 and 414 to provide first and second points of contact, respectively, for the substrate during imaging, processing, holding, or the like. The first and second securing blocks 412 and 414 guide the substrate off of the platforms and constrain the substrate at the first and second contact points, respectively. The first and second securing blocks 412 and 414 may be attached to the first arm 404 by at least one fastener (not shown, such as a screw, a nail, a peg, a pin, a nut and bolt, a dowel, a staple, a rivet, or the like), by an adhesive, by welding, or the like. Alternatively, the first and second securing blocks 412 and 414 and the first arm 404 may be formed as a single piece, such as by molding, machining, or the like.

The secure bar 406 may be attached to the base 402 by a bearing 416 and a fastener 418. A third securing block 420, to provide a third point of contact for the substrate during imaging, processing, holding, or the like, may be attached to or may be formed as a part of the secure bar 406. The third securing block 420 guides the substrate off of the platforms and constrains the substrate at a third point. Furthermore, the three contact points imparted by the securing blocks 412, 414, and 420 provide for a kinematic mount. The bearing 416 allows the secure bar 406 to move relative to the secure bar 406 into open and closed positions. When in the open position, the secure bar 406 permits the substrate to freely slide into and out the holder 400; and when in the closed position, the third securing block 420 on the secure bar 406 and the first and second securing blocks 412 and 414 exert forces on the substrate to secure the substrate within the holder 400.

The holder 400 may also include cutouts 420 on an inner corner where the proximal ends of the first and secure bars 404 and 406 meet the base 402. There may also be cutouts 424 at the distal ends of the first and secure bars 404 and 406. The cutouts 424 permit for any appropriately sized substrate to be used since the corners of the substrate may fit within the cutouts 424 instead of breaking off or chipping when being placed into the holder 400. The holder 400 may be composed of ceramic, glass, plastic, metal, or combinations thereof.

The bar motor 422 may be connected to the secure bar 406 directly (i.e. the bar motor 422 touches the secure bar 406 such that driving the bar motor 422 causes the secure bar 406 to open and close) or indirectly (i.e. the bar motor 422 is adjoined to the secure bar 406 by at least one intermediary piece such that driving the bar motor 422 causes the intermediary piece to translate or rotate and, accordingly, cause the secure bar 406 to open and close).

The holder 400 may be attached to a secondary device for imaging and/or processing by an attachment mechanism 426 (i.e. a plate, a screw, a nail, a peg, a pin, a nut and bolt, a dowel, a staple, a rivet, or the like). The holder 400 may include at least one hole to accommodate the attachment mechanism 426 for proper, secure attachment to the secondary device. Alternatively, the holder 400 may be attached to a secondary device for imaging and/or processing by an adhesive, by welding, by clips, by detents, by tongue and groove joint, or the like.

The securing blocks 108, 110, 114, 412, 414, 420 may be composed of a material, such as tungsten carbide, which is not abraded by the substrate or by contact with the substrate. Preventing abrasion maintains a consistent surface on the securing blocks 108, 110, 114, 412, 414, 420, thereby permitting for consistent mounting of the substrate within the securing blocks 108, 110, 114, 412, 414, 420. The securing blocks 108, 110, 114, 412, 414, 420 may also be domed to minimize or reduce friction.

Gripper

Figure 5A:
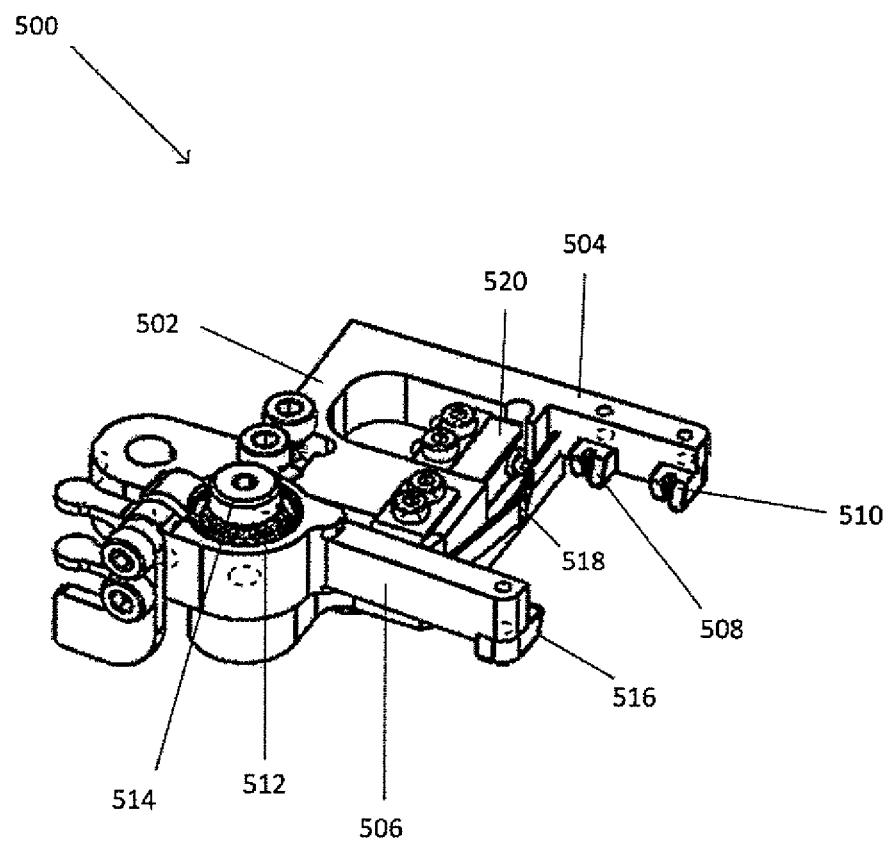
FIGS. 5A-5C show an example gripper.
Figure 5B:
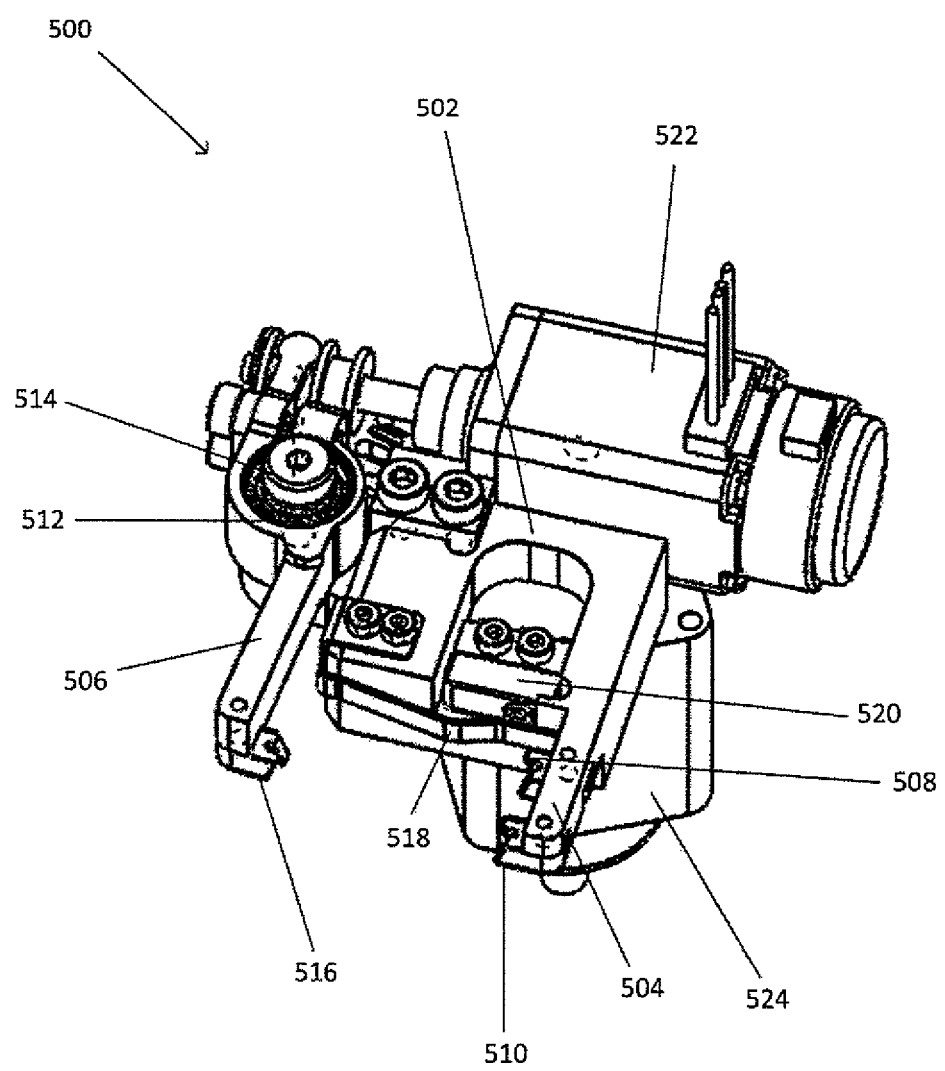
Figure 5C:
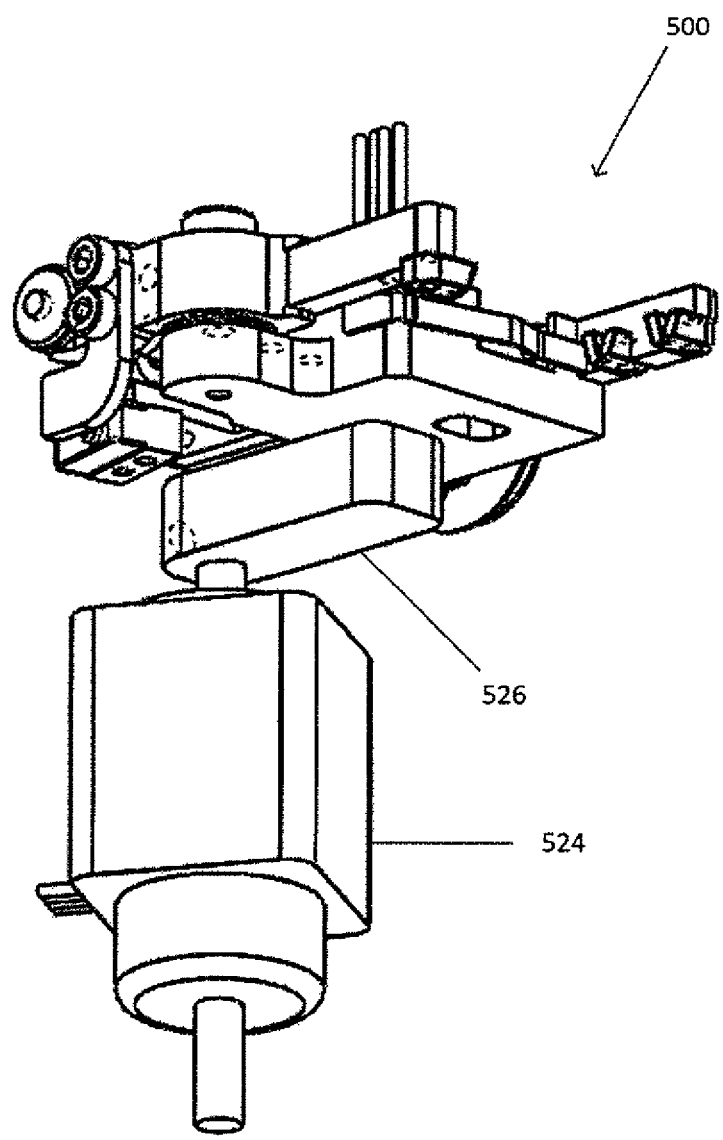

FIGS. 5A-5C show isometric views of a gripper 500 to securely hold a substrate, such as a microscope slide or a well plate. For the sake of convenience, the gripper 500 is described with reference to a J-shape frame as an example frame. But the frame described below is not intended to be so limited in its scope of application. The frame, in practice, may be a four-walled frame (i.e. a main body with a cavity extending through the main body), U-shaped, or the like.

The gripper 500 includes a frame including a base 502, a first arm 504, and a secure bar 506. The first arm 504 includes a proximal end connected to a first end of the base 502 and a distal end extending from the base 502. The first arm 504 also includes first and second securing brackets 508 and 510 to provide first and second points of contact, respectively, for the substrate during imaging, processing, holding, or the like. The first and second securing brackets 508 and 510 may be attached to the first arm 504 by at least one fastener (not shown; i.e. a screw, a nail, a peg, a pin, a nut and bolt, a dowel, a staple, a rivet, or the like), by an adhesive, by welding, or the like. Alternatively, the first and second securing brackets 508 and 510 and the first arm 504 may be formed as a single piece, such as by molding, machining, or the like.

The secure bar 506 includes a proximal end connected to a second end of the base 502 and a distal end extending from the base 502. The secure bar 506 may be attached to base 502 by a bearing 512 and a fastener 514. The bearing 512 allows the secure bar 506 to move relative to the base 502 into open and closed positions. When in the open position, the secure bar 512 permits the substrate to freely slide into and out the gripper 500; and when in the closed position, the third securing bracket 516 on the secure bar 512 and the first and second securing brackets 508 and 510 exert forces on the substrate to secure the substrate within the gripper 500. A third securing bracket 516, to provide a third point of contact for the substrate during imaging, processing, holding, transferring, or the like, may be attached to or may be formed as a part of the secure bar 512. The third securing bracket 516 may be attached to the secure bar 506 by at least one fastener (not shown; i.e. a screw, a nail, a peg, a pin, a nut and bolt, a dowel, a staple, a rivet, or the like), by an adhesive, by welding, or the like. Alternatively, the third securing bracket 516 and the secure bar 506 may be formed as a single piece, such as by molding, machining, or the like.

The gripper 500 may include a crossbar 518 extending from the first arm 504 to a side of the base 502 proximal to the secure bar 506. The crossbar 518 may be deflectable (e.g. a spring) such that force exerted on the crossbar 518 by the substrate within the gripper 500 causes the crossbar 518 to deflect towards a sensor 520. The crossbar 518 may contact the sensor 520 or may deflect up to a pre-determined distance towards the sensor 520. The sensor 520 may be mechanical (e.g. switch), electrical (e.g. linear encoder), capacitive, optical (e.g. laser), acoustic, inductive (e.g. linear variable differential transformer), or the like.

The gripper 500 may also include cutouts (not shown) on an inner corner where the proximal ends of the first arm 504 and secure bar 506 meet the base 502. The cutouts (not shown) permit for any appropriately sized substrate to be used since the corners of the substrate may fit within the cutouts (not shown) instead of breaking off or chipping when being placed into the gripper 500. The gripper 500 may be composed of ceramic, glass, plastic, metal, or combinations thereof.

The gripper 500 may be attached to a secondary device (not shown) for imaging and/or processing by an attachment mechanism (i.e. a screw, a nail, a peg, a pin, a nut and bolt, a dowel, a staple, a rivet, or the like), by an adhesive, by welding, by clips, by detents, by tongue and groove joint, or the like. The gripper 500 may include at least one hole to accommodate the attachment mechanism for proper, secure attachment to the secondary device.

To open and close the secure bar 506, a first motor 522 may be connected to the secure bar 506 directly (i.e. the first motor 522 contacts the secure bar 506 such that driving the first motor 522 causes the secure bar 506 to open and close) or indirectly (i.e. the first motor 522 is adjoined to the secure bar 506 by at least one intermediary piece such that driving the first motor 522 causes the intermediary piece to translate or rotate and, accordingly, cause the secure bar 506 to open and close). To rotate the gripper 500 around a longitudinal axis such that the gripper rotates from a cassette to the holder 400, a second motor 524 may be connected to the gripper 506 directly (i.e. the second motor 524 touches the gripper 506 such that driving the second motor 524 causes the gripper 506 to open and close) or indirectly (i.e. the second motor 522 is adjoined to the gripper 506 by at least one intermediary piece 526 such that driving the second motor 522 causes the intermediary piece to translate or rotate and, accordingly, cause the gripper 506 to open and close).

Figure 6A:
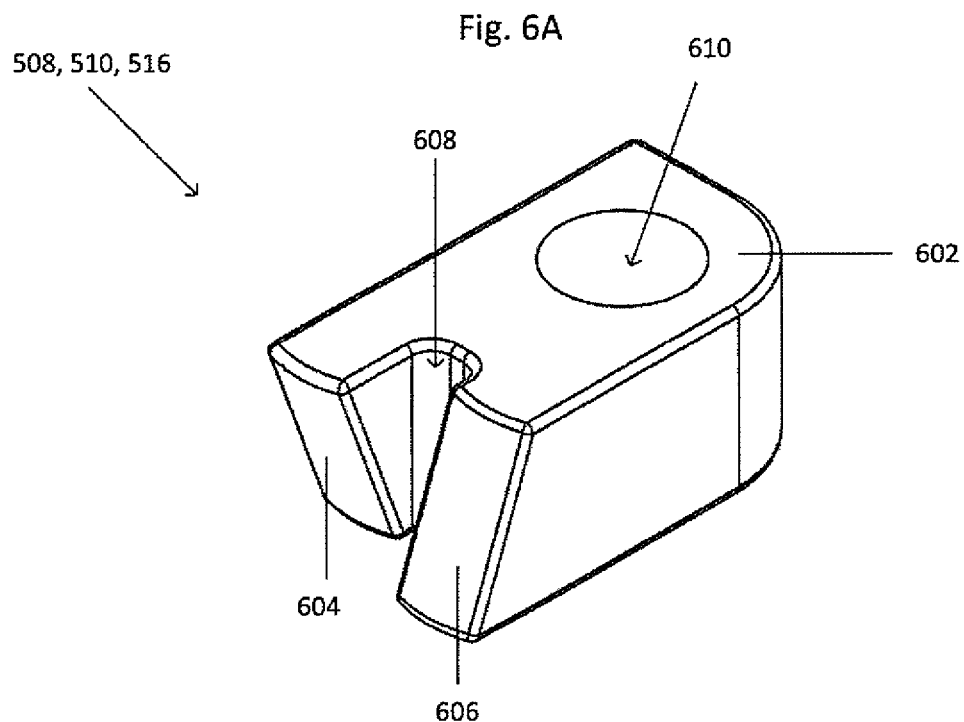
FIGS. 6A-6B show an example securing block.
Figure 6B:
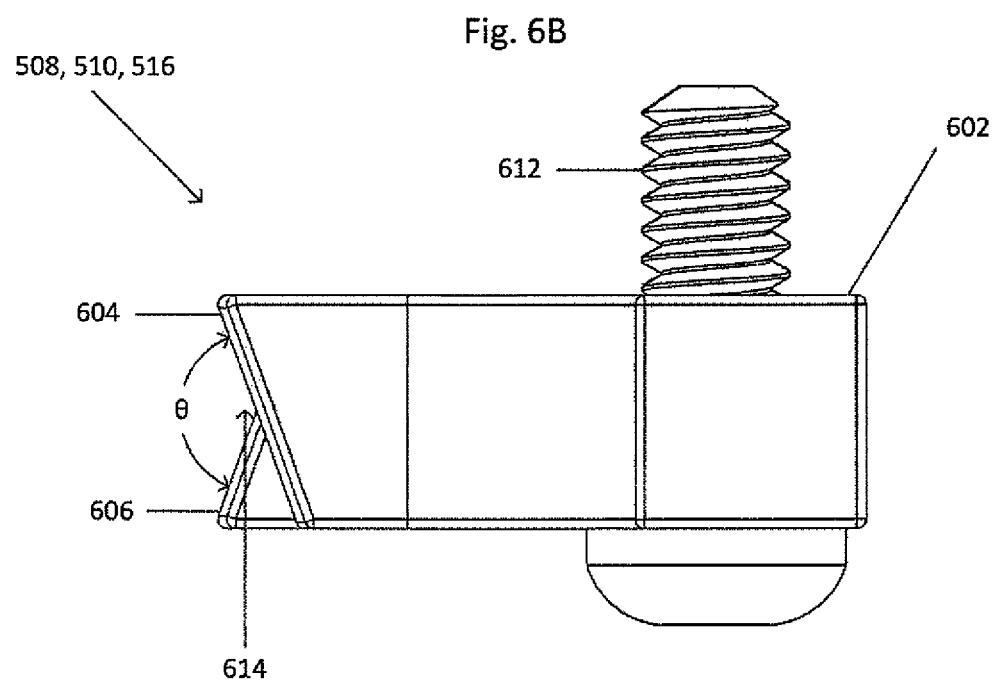

FIG. 6A shows an isometric view of the securing brackets 508, 510, 516. FIG. 6B shows a side view of the securing brackets 508, 510, 516. The securing brackets 508, 510, 516 provide a controlled references surface for the substrate during imaging, processing, holding, or the like. The securing brackets 508, 510, 516 also include a notch 614 having an angle θ formed by the respective slants of the first and second slanted facets 604, 606. The notch 614 holds and secures the substrate within the securing brackets 508, 510, 516. The angle θ may be acute, obtuse, or a right angle. The first and second facets 604, 606 may be any appropriate shape, including, but not limited to, triangular, hemispherical, parabolic, trapezoidal, or the like. The securing brackets 508, 510, 516 include a main body 602 with a first facet 604 and a second facet 606, both of which extend from the same side of the main body 602. When the secure bar (not shown) is moved into a closed position, the substrate (not shown) is held or gripped within the notch 614. The main body 602 may include at least one hole 610 to accept the at least one fastener 612, such as a screw or nut and bolt, to attach to the gripper (not shown). The main body 602 may be a single piece or may be two pieces. When the main body 602 is two pieces, a first piece includes the first facet 604 and a second piece includes the second facet 606. The securing brackets 508, 510, 516 may also include at least one height adjuster (not shown), such as a shim, to adjust the heights of the securing brackets 508, 510, 516 relative to the first arm (not shown) and the secure bar (not shown) of the gripper (not shown).

The securing brackets 508, 510, 516 may be composed of a material, such as tungsten carbide, which is not abraded b the substrate or by contact with the substrate. Preventing abrasion maintains a consistent surface on the securing brackets 508, 510, 516, thereby permitting for consistent mounting of the substrate within the securing brackets 508, 510, 516. The securing brackets 508, 510, 516 may also be domed to minimize or reduce friction.

Cassette Holder

Figure 7A:
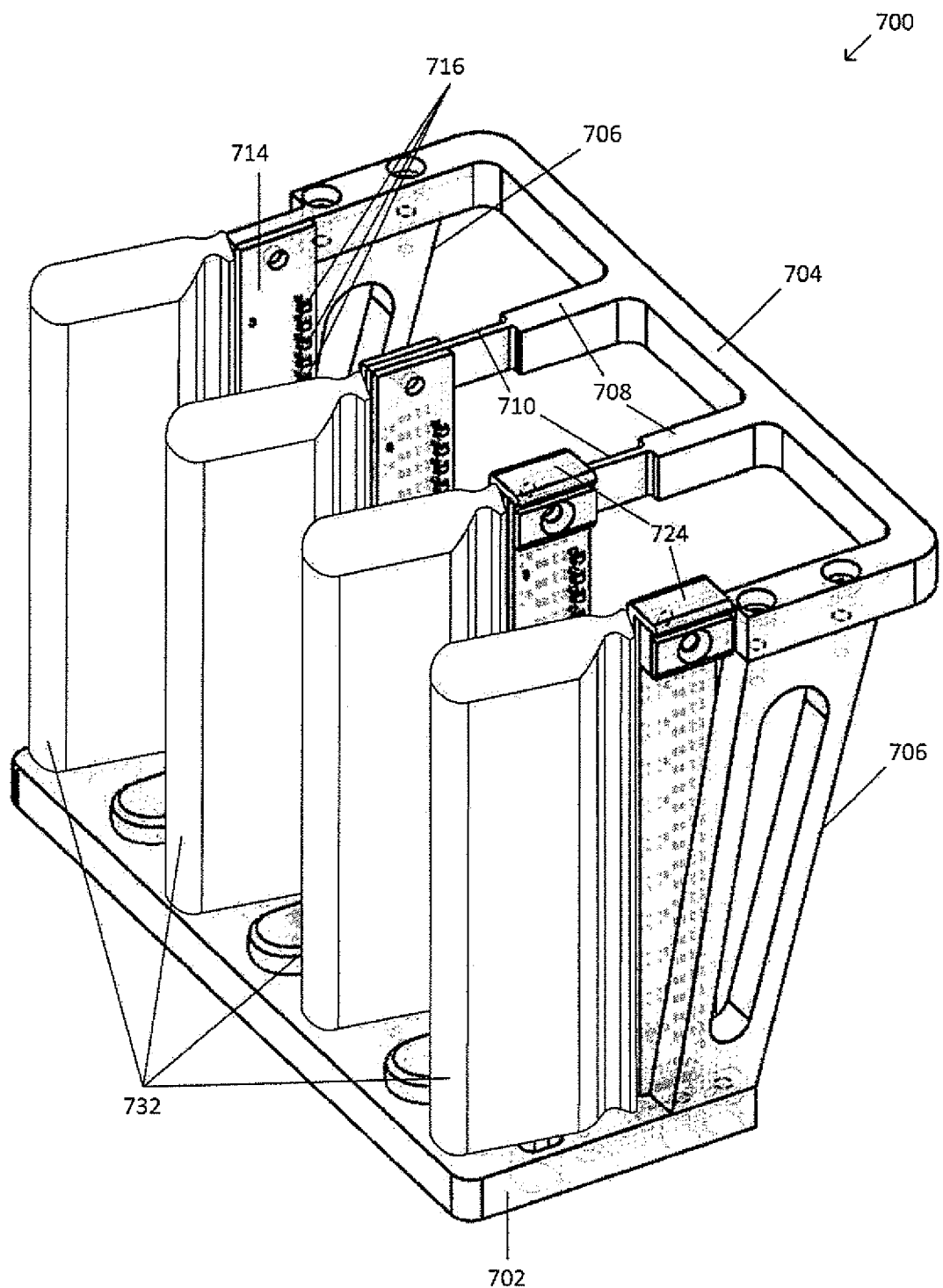
FIGS. 7A-7E show an example cassette holder.
Figure 7B:
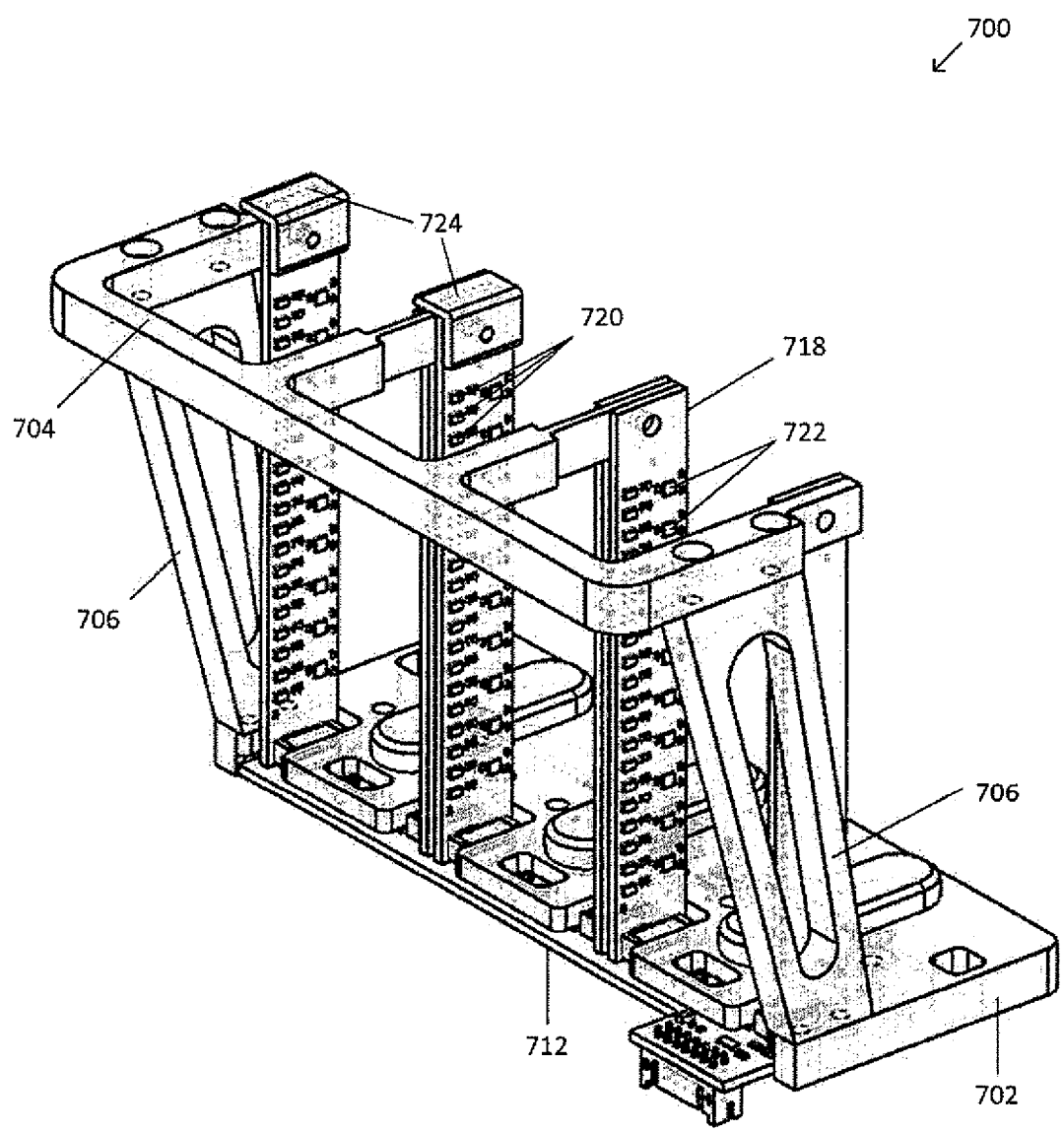
Figure 7C:
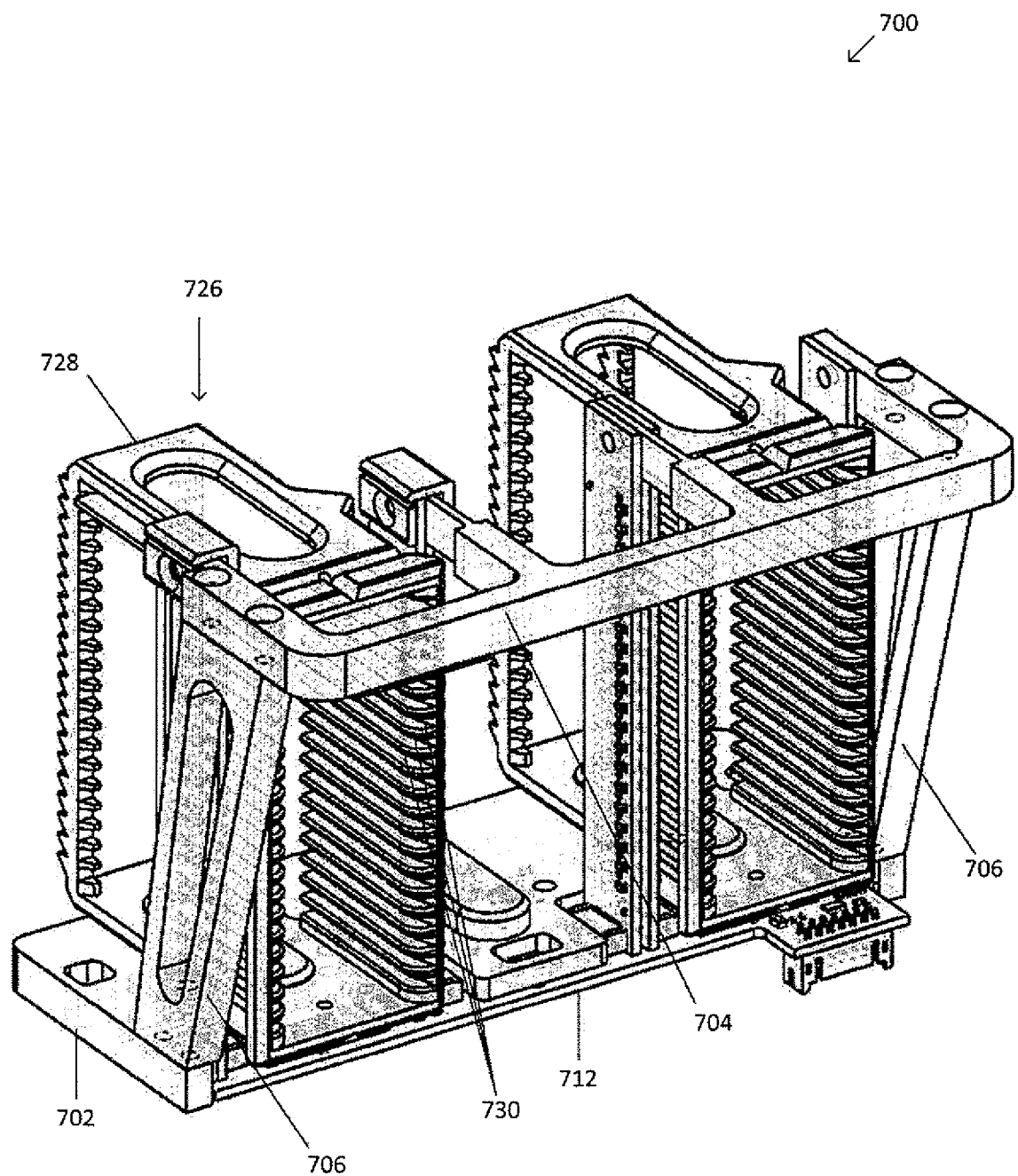
Figure 7D:
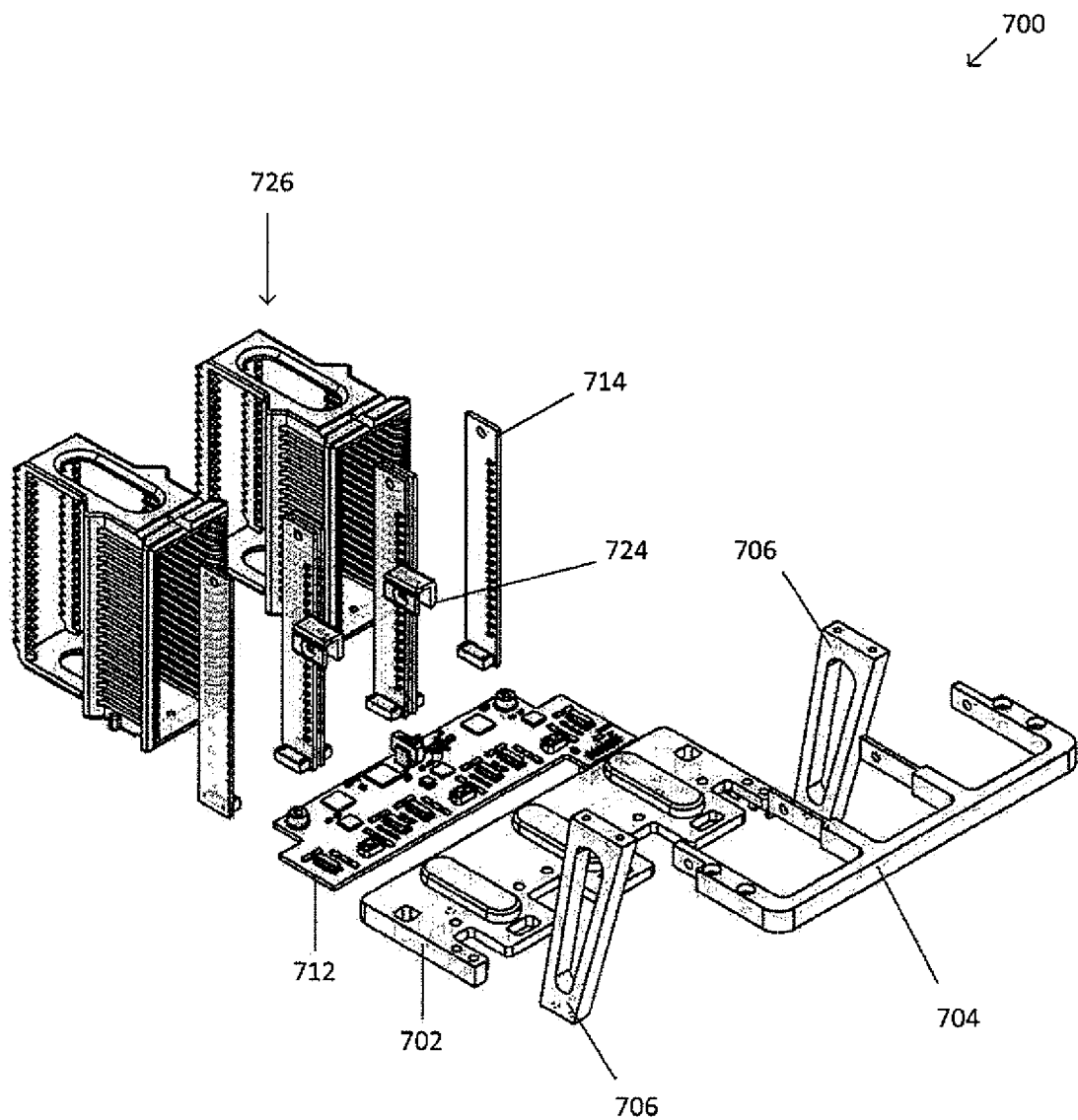
Figure 7E:
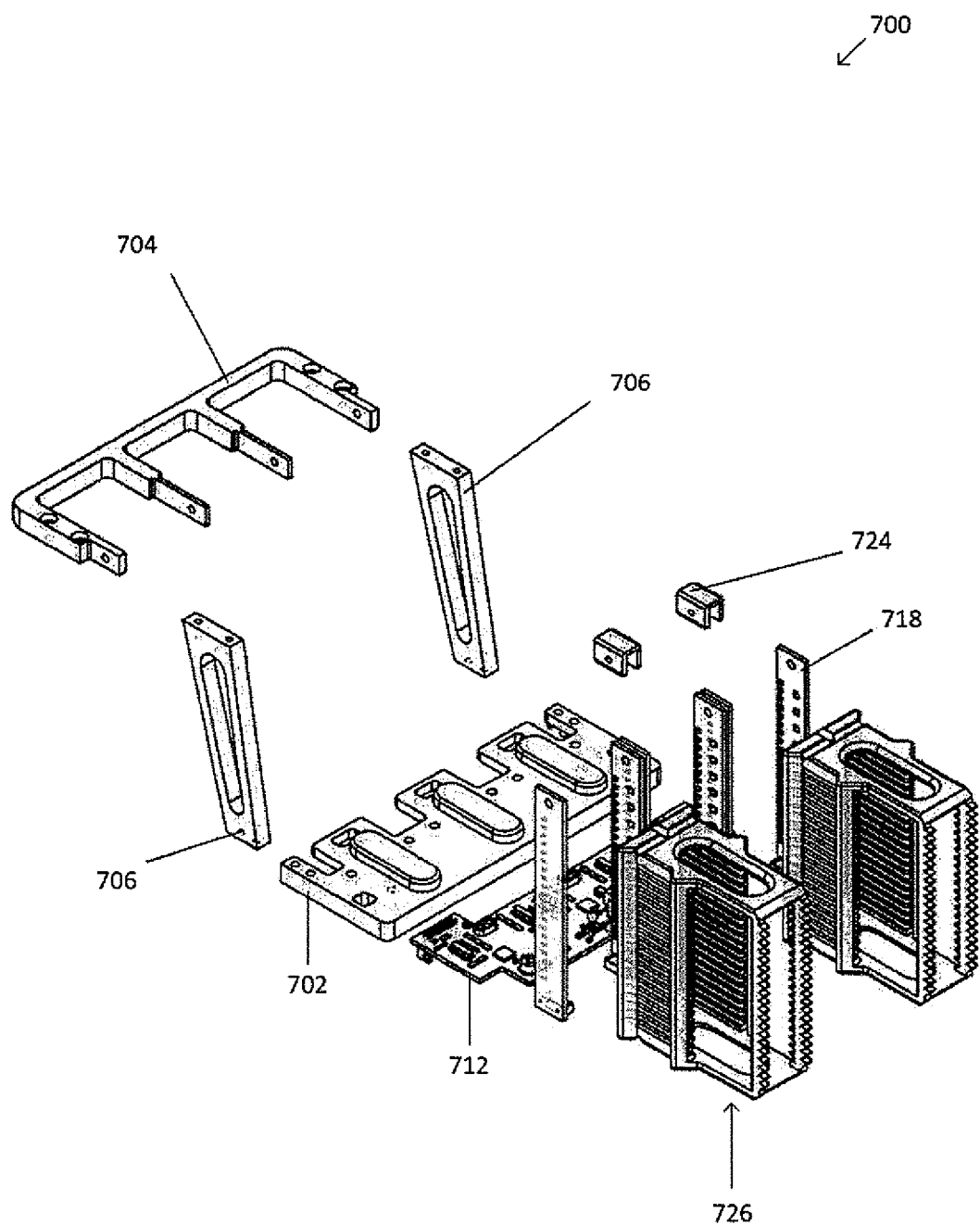

FIGS. 7A-7C show isometric views of a cassette holder 700. FIGS. 7D and 7E show exploded views of the cassette holder 700. The cassette holder 700 includes a base 702 connected to a bracket 704 by at least one strut 706. The bracket 704 may include at least one arm 708 which may include an extension 710. The base 702 may also be adjoined to or overlaid on a control board 712 which is adjoined or connected to at least one light source board 714 including a plurality of light sources 716 and at least one detector board 718 including a plurality of detectors 720. The detector board 718 may include at least one amplifier 722. The at least one light source board 714 and the at least one detector board 718 form a pair, whereby the plurality of light sources 716 and the plurality of detectors 720 face each other such that corresponding light sources and detectors at equivalents heights on or along their respective boards. Furthermore, the plurality of light sources 716 and detectors 720 form a row or a column. For example, a first light source corresponds to and is at an equivalent height as a first detector, a second light source corresponds to and is at an equivalent height as a second detector, and so on.

Alternatively, the system 700 may include one light source 716, which may move along the light source board 714 or may move independently. The system 700 may include a number of detectors for a respective light source as determined by the following equation:

$$\text{Number of detectors} = 1 + (2 \times (n \text{ slot offsets})),$$

where "n slot offsets" refers to the number of slots that one side of the substrate may be off within the given cassette 726. For example, when a substrate may be off by 2 slots in a given cassette (see FIG. 9B), the number of detectors is $1+(2\times(2))=5$. The detectors may move along the detector board 718 or may move independently, but in conjunction with the light source 716. Though the light source 716 and detectors 720 are described as being movable relative to the cassette 726 and the substrate, the cassette 726 and the substrate may move relative to the light source 716 and the detectors 720.

The at least one light source board 714 extends from the control board 712 to the bracket 704; and the at least one detector board 718 extends from the control board 712 to the bracket 704. Alternatively, the at least one light source board 714 and the at least one detector board 718 may connect to the at least one arm 708 or the at least one extension 710. The at least one light source board 714 and the at least one detector board 718 are adjoined or connected to the bracket 704 with a clasp 724. Alternatively, the at least one light source board 714 and the at least one detector board 718 are adjoined or connected to the bracket 704 with a screw, a pin, a clamp, or any appropriate fastener.

When multiple pairs of light boards 714 and detector boards 718 are implemented, the light board 714 of one pair may be adjoined or connected to the bracket 704 at the same or a substantially similar point as the detector board 718 of a different pair. When the light board 714 of one pair is adjoined or connected to the bracket 704 at a substantially similar point as the detector board 718 of a different pair, the light sources 716 and the detectors 718 of those boards face away from each other and towards their respective pair mates.

The light sources 716 may be any appropriate light source, including, but not limited to, a light emitting diode, a lamp, or a bulb. The detectors 720 may be any appropriate detector, including, but not limited to a photodiode, a photo cell, a light dependent resistor, or a phototransistor.

The cassette holder 700 may also include a cassette 726. The cassette 726, which sits on the base 702 between one light board source 714 and one detector board 718, includes a frame 728 including at least one slot 730 configured to hold and support a substrate (not shown), such as a microscope slide. The at least one slot 730 may be formed by grooves or notches within the frame 728 or with platforms extending inwardly from the frame 728 to support the substrate. The cassette 726 may include up to 700 slots.

The cassette holder 700 may also include at least one cassette guide 732 to limit the distance a substrate may be inserted into the cassette 726 and to limit the movement or rotation of the cassette 726. The at least one cassette guide 732 may include a groove along which the cassette 726 may be introduced or mated. The at least one cassette guide 732 may be located on either side of the cassette 726 or on both sides of the cassette 726, and may further be located in between consecutive cassettes 726 when more than one cassette 726 is present.

Figure 8A:
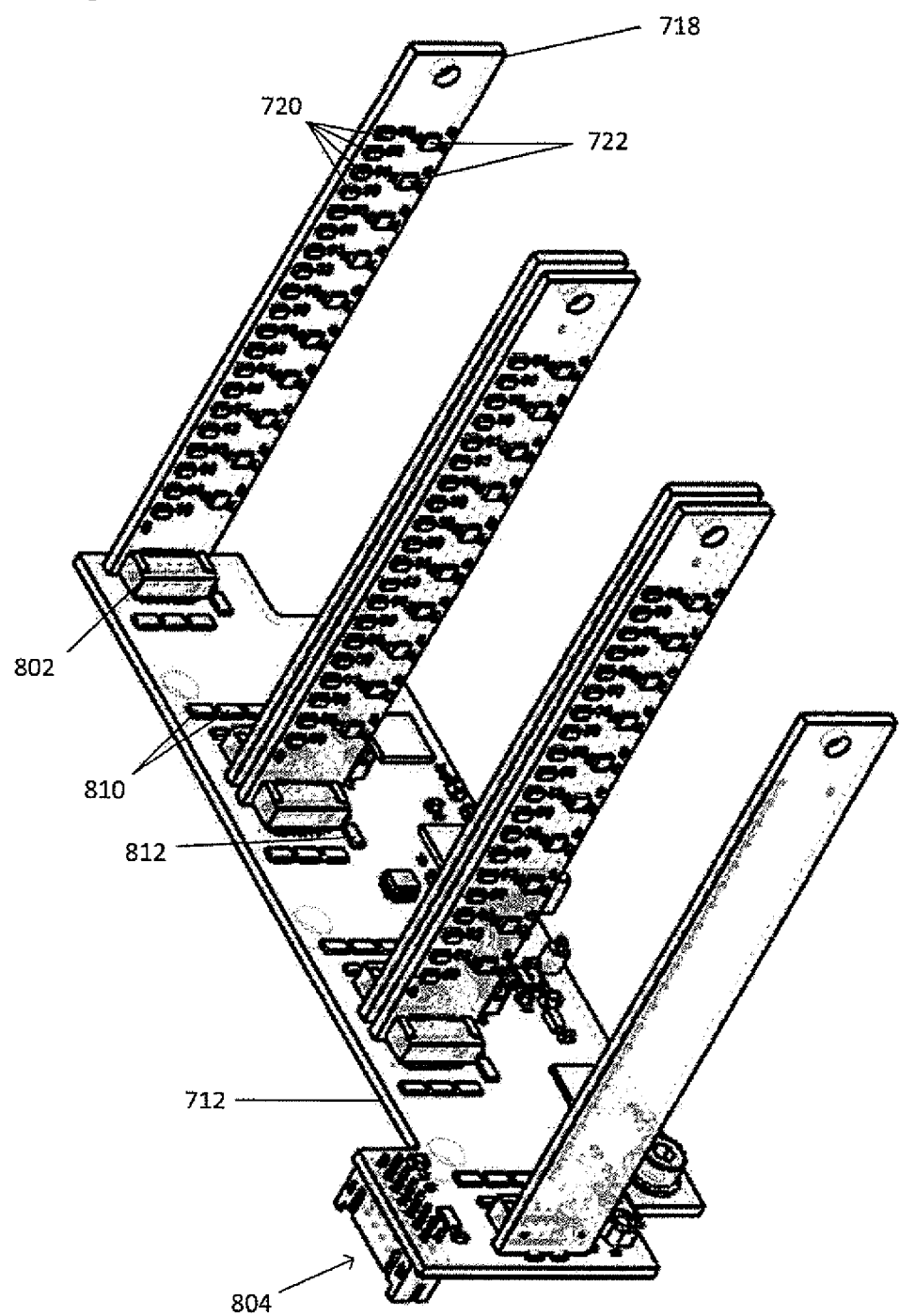
Figure 8D:
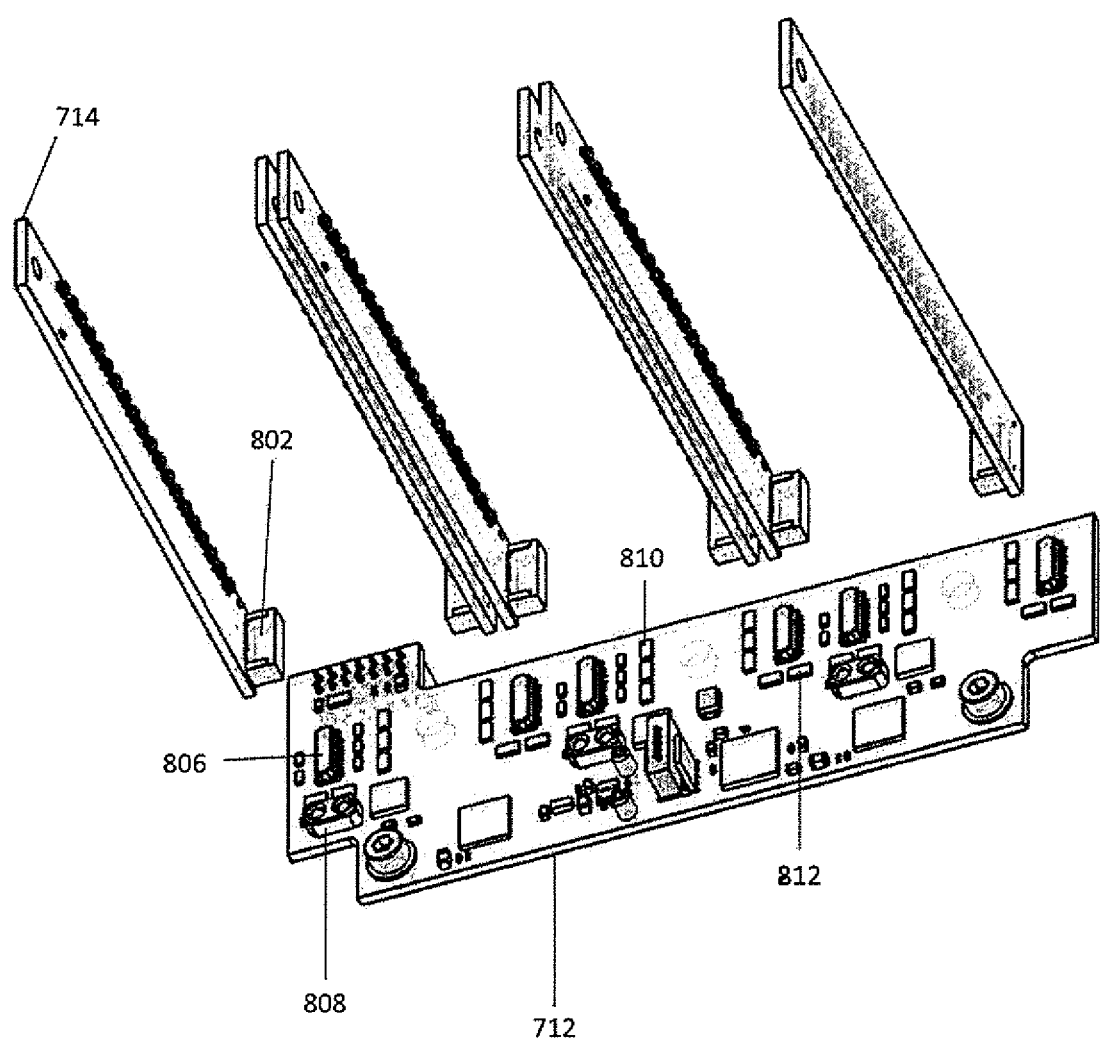

FIGS. 8A and 8B show isometric views of the control board 712 adjoined or connected to at least one light source board 714 including plurality of light sources 716 and at least one detector board 718 including the plurality of detectors 720. FIGS. 2C and 2D show exploded views of the control board 712 adjoined or connected to at least one light source board 714 including the plurality of light sources 716 and at least one detector board 718 including plurality of detectors 720. The light source board 714 and the detector board 718 each include an electrical interface 802. The control board 712 includes a communication interface 804 and complementary electrical interfaces 806. The communication interface 804 of the control board 712 mates with a complementary communication interface (not shown) on a main board (not shown), whereby the main board (not shown) controls a scanner and/or picking system (not shown). The electrical interface 802 of the light source board 714 and the detector board 718 mates with the respective complementary electrical interface 806 on the control board 712 to permit communication between the main board (not shown) and the light source board 714 and the detector board 718. Alternatively, though the main board (not shown) and the control board 712 are depicted as separate boards, the main board (not shown) and the control board 712 may be one board.

The control board 712 may also include sensors 808, ferrites 810, and ESD protectors 812. The sensors 808 (e.g. mechanical (switch), electrical (linear encoder), capacitive, optical (laser, reflective), acoustic, inductive (linear variable differential transformer), or the like) determine whether or not a cassette is loaded between a light source board-detector board pairing. The ferrites 810 allow for electromagnetic compatibility, such as suppression of or compliance with national and/or international regulations for radiated energy. The ESD protectors 812 provide protections against static discharge.

System and Method

A method for automated loading of a substrate is also discussed. For the sake of convenience, the methods are described with reference to a slide as an example substrate and a scanner as an example secondary device. But the methods described below are not intended to be so limited in their scope of application. The methods, in practice, may be used with any other kind of substrate including, but not limited to, a well plate, and any other appropriate secondary device including, but not limited to, a fluorescent microscope, a picking device, a scanner with a picking device, a fluorescent microscope with a picking device, or any imaging or processing machine.

Figure 10:
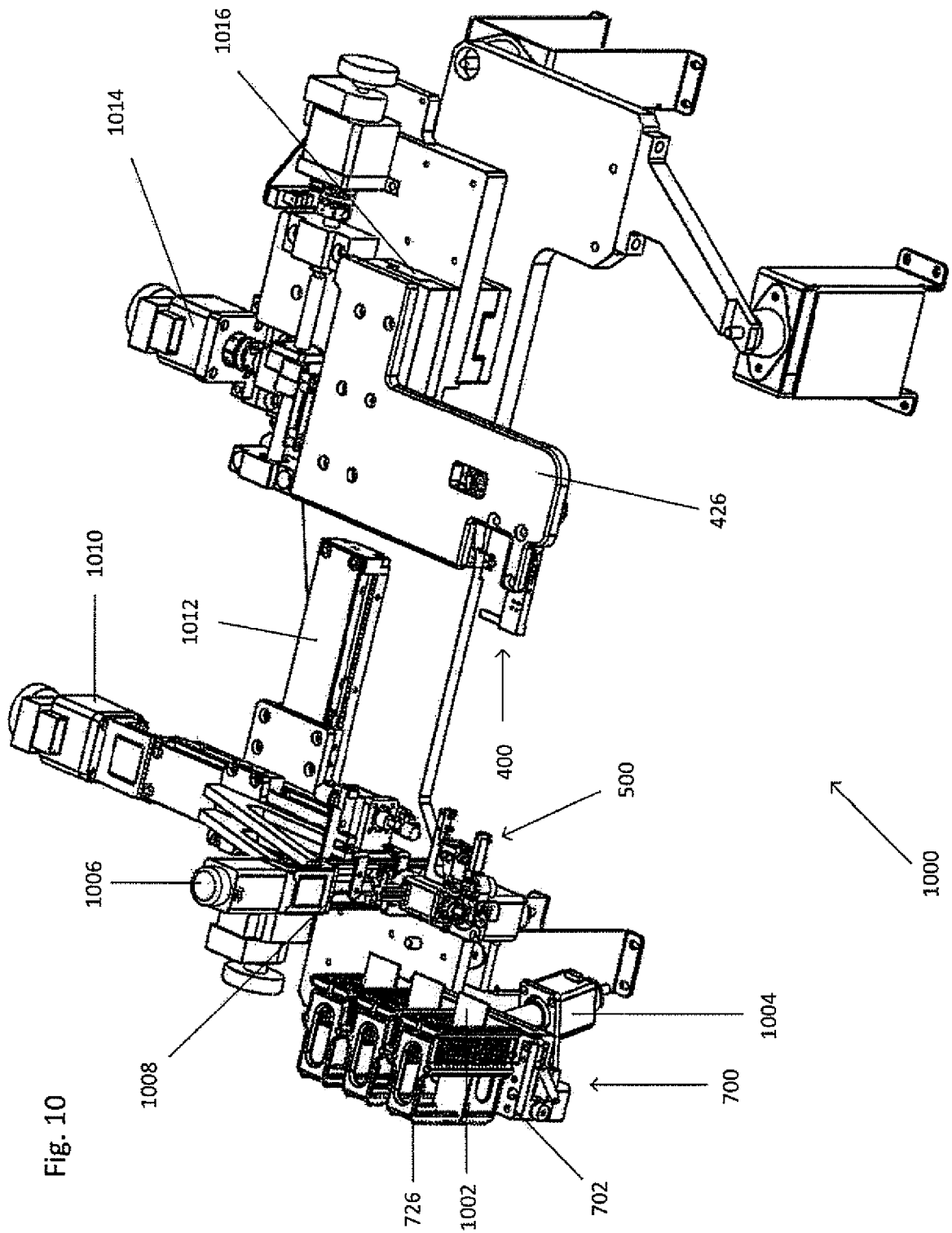
FIG. 10 shows an example system.

FIG. 10 shows a system 1000. The system 1000 may be a sub-system of a larger system (not shown), such as any appropriate secondary device including, but not limited to, a fluorescent microscope, a picking device, a scanner with a picking device, a fluorescent microscope with a picking device, or any imaging or processing machine. The system 1000 includes the holder 400, the gripper 500, the cassette holder 700, and at least one cassette 726 including at least one substrate 1002.

First, the cassette 726 is loaded with the at least one substrate 1002. The cassette 726, upon being loaded with the desired number of substrates 1002, is inserted into the cassette holder 700 between one pair of the light source board 714 and the detector board 718. After the cassette 726 is inserted into the cassette holder 700, the light sources 716 may be activated individually, such that one light source 716 on a given light source board 714 emit light at a given time. Alternatively, multiple light sources 716 on the light source board 714 may be activated simultaneously so long as crosstalk between the activated light sources and non-corresponding detectors is eliminated or validated and removed via subsequent processing.

When multiple light boards 714 are used, multiple light sources 716 may be activated simultaneously on the same and/or different light source boards 714. In use, the light emitted by the light source 716 is transmitted via the substrate based on the internal reflection of the at least one substrate 1002 to one of the detectors 720 based on the orientation of the substrate within the cassette holder 700. The detector 720 captures the transmitted light and generates a signal, such as an electrical signal, that represents the presence and/or orientation of the at least one substrate 1002. The signal is digitized and processed by a controller, including, but not limited to a processor, a microprocessor, or a microcontroller, along with any associated software, or the like. Due to the internal reflection of the at least one substrate 1002, the detector 720 may receive up to 30 times (including up to 2 times, 3 times, 4 times, 10 times, or the like) more light when the at least one substrate 1002 is present than when the at least one substrate 1002 is absent. It should be noted, however, that the detector 720 receiving the light is the detector 720 that corresponds to the slot 730 at which one end of the at least one substrate 1002 is present.

Figure 9C:
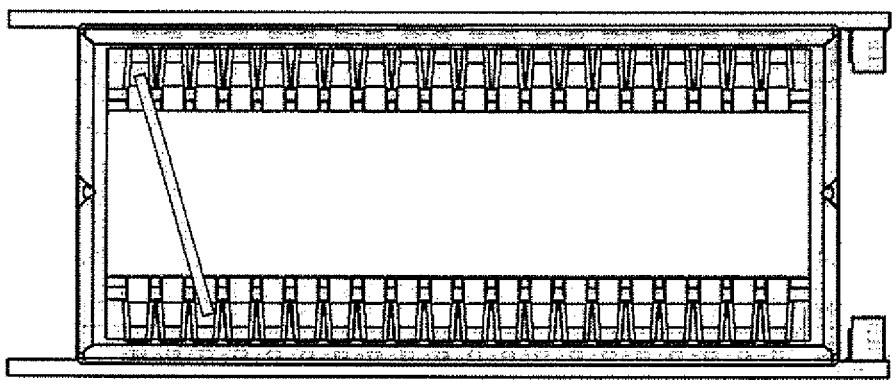
FIGS. 9A-9C show example substrate orientation within the cassette.
Figure 9B:
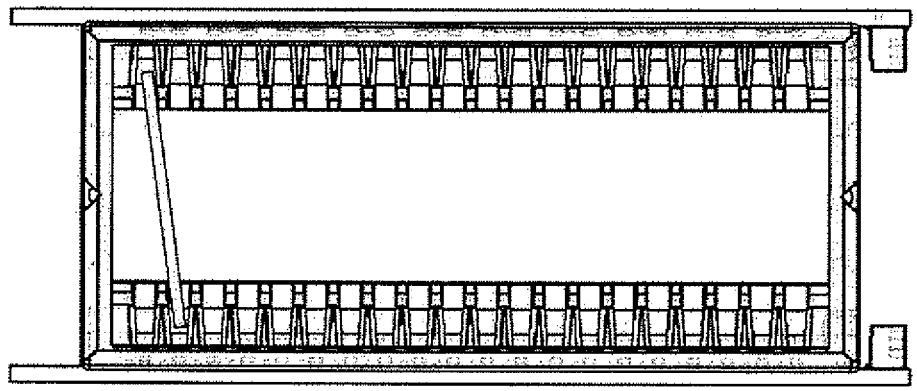
Figure 9A:
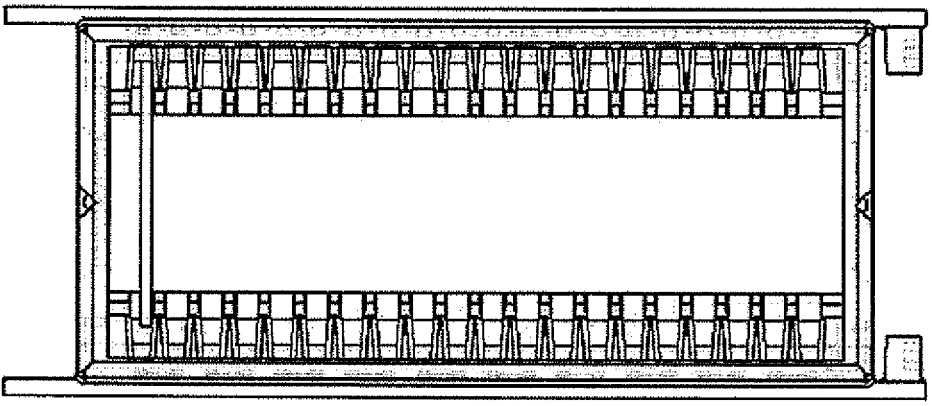

For example, FIG. 9A shows a present and properly oriented substrate. When at least one substrate is present and properly oriented within the slot 730 of the cassette 726, the first light source is activated and the emitted light is transmitted to the first detector. However, when the at least one substrate is improperly oriented (i.e. angled—one edge is located on a first slot and another edge is located one slot above or below the first edge (FIG. 9B) or one edge is located on a first slot and another edge is located two slots above or below the first edge (FIG. 9C)), the non-corresponding detector 720 may capture the light emitted by the activated light source 716. In FIG. 9B, when the first light source 716 is activated, and the at least one substrate is off by one slot, the second detector 720 may capture the emitted light. In FIG. 9C, when the first light source 716 is activated, and the at least one substrate is off by two slots, the third detector 720 may capture the emitted light. In other words, when a light source is activated and a corresponding detector captures the emitted light (as determined by the signal), the at least one substrate is present and inserted properly; when a light source is activated and a non-corresponding detector captures the emitted light (as determined by the signal), the at least one substrate is present but inserted improperly; and when a light source is activated and the signal does not exceed a pre-determined threshold (as determined by the signal), the at least one substrate is absent. Since the light sources on the light source board are not activated simultaneously, but rather activated sequentially, randomly, or in a pre-programmed manner, it may be possible to determine the presence and orientation (straight or angled) by determining which detector receives a signal—detector corresponding to activated light source (substrate is present and proper), detector not corresponding to activated light source (at least one substrate is present and improper), or no detector (no substrate present). Furthermore, when a substrate is not inserted properly, the detector corresponding to the activated light source receives half of the signal intensity as when the slot is empty. In other words, the improperly inserted substrate may also block the transmission of light.

It should be understood that the method and system described and discussed herein may be used with any appropriate substrate, such a well plate, a slide, or the like. When the at least one substrate is transparent, the at least one substrate acts as a light guide, thereby transmitting the light from the light source to the detector. When the at least one substrate is opaque, a focusing lens on the light source may be required; though an opaque substrate may only in determining presence or absence of the substrate, not orientation. It may also be possible, such as a with a cassette that transmits light, to determine substrate presence and/or orientation/placement based on light signals of corresponding and/or offset detectors due to light reflection off of substrates above and below the substrate within the desired slot. Additionally, the loading of at least one substrate into the cassette may be manual, automated, or a combination thereof. Furthermore, the loading of the cassette with at least one substrate and inserting the cassette into the cassette holder may be manual, automated, or a combination thereof.

After the presence and orientation of the at least one slide 1002 within the cassette 726 is determined, the gripper 500 is brought proximal to the at least one substrate 1002, such that the secure bar 506 of the gripper 500 is on a first side of the at least one substrate 1002 and the first arm 504 of the gripper 500 is on a second side of the at least one substrate 1002. To bring the gripper 500 proximal to the at least one substrate 1002, the gripper 500 may be moved along a horizontal track 1012 by a gripper horizontal motor 1010 and/or along a vertical track 1008 by a vertical motor 1006. The vertical motor 1006 drives the gripper along the vertical track 1008 to move the gripper 500 to an appropriate height for the desired slot of the cassette 726. The gripper horizontal motor 1010 drives the gripper along the horizontal track 1012 to move the gripper 500 proximal to the at least one substrate 1002.

The secure bar 506 of the gripper 500 is then driven to a closed position by the first motor 522, thereby securing the at least one substrate 1002 with the gripper 500. The gripper horizontal motor 1010 then pulls the gripper 500, now including the at least one substrate 1002, away from the cassette 726. A tilt motor 1004 may also tilt the cassette base 702 on which the cassette 726 rests to provide more clearance for the subsequent rotation of the gripper 500. The tilt motor 1004 may also tilt the cassette base 702 when a door to the secondary device is opened, thereby allowing for insertion of the cassette 726 onto the cassette base 702. The second motor 524 then causes the gripper 500 to rotate along a longitudinal axis so as to face the holder 400. The tilt motor 1004 may then move (or caused to be moved) the cassette base 702 on which the cassette 726 rests into an appropriate orientation, such as flat, level, or parallel to the gripper 500, for later insertion and removal of the at least one substrate 1002. The at least one substrate 1002 is then brought proximal to the holder 400, such that the secure bar 406 of the holder 400 is on the second side of the at least one substrate 1002 and the first arm 404 of the holder 400 is on the first side of the at least one substrate 1002. To bring the at least one substrate 1002 proximal to the at least one substrate 1002, the gripper 500 may be moved along the gripper horizontal track 1012 by the gripper horizontal motor 1010 and/or along the vertical track 1008 by the vertical motor 1006. The vertical motor 1006 drives the gripper along the vertical track 1008 to move the gripper 500 to an appropriate height for the desired slot of the cassette 726. The gripper horizontal motor 1010 drives the gripper 500 along the gripper horizontal track 1012 to move the gripper 500 proximal to the at least one substrate 1002. The holder 400 may also be moved along a holder horizontal track 1016 by a holder horizontal motor 1018 to bring the holder 400 more proximal to the gripper 500. The holder 400 and the gripper 500 may both be driven along the respective horizontal tracks 1016, 1012 by the respective horizontal motors 1018, 1010 to be more proximal to one another.

To unstick a stuck substrate from the cassette 726, the gripper 500 may be moved in a direction opposing the closing motion of the secure bar 506. Alternatively, the gripper 500 may be oscillated, vibrated, or moved along the z axis once the substrate is gripped by the gripper 500. The substrate may stick due the substrate being wet. The substrate may be coated with Teflon to reduce or eliminate sticking.

The secure bar 506 of the gripper 500 is then driven into an open position by the first motor 522, such that the at least one substrate 1002 rests on the base platform 408 and the first platform 410. The secure bar 406 of the holder 400 is then moved into the closed position causing the third securing block 420 to force the at least one substrate 1002 against the first and second securing blocks 412, 414. The ramps 306 of the respective securing blocks lift the at least one substrate 1002 up and off of the base and first platforms 408, 410 and confine the at least one substrate 1002 against the stoppers 304. The gripper 500 then moves closer to the holder 400 along the gripper horizontal track 1012 such that the crossbar 518 exerts a force on the at least one substrate 1002 to push the at least one substrate 1002 further into the holder 400. The crossbar 518 may contact the sensor 520 or may deflect up to a pre-determined distance towards the sensor 520 based on the applied force. When the sensor 520 is not activated, an error may have occurred (such as a misalignment, a misplacement, a substrate not seated properly, or the like) and an operator may be notified or the automation may be performed again to correct the error. Once the at least one substrate 1002 is secured within the holder 400, the holder 400 may translate along the holder horizontal track 1016 away from the gripper 500 for further processing and/or imaging within the secondary device (not shown).

The process denoted above may be reversed to return the at least one substrate 1002 to the cassette 726. The process denoted above may also be performed more than once to process and/or image any number of substrates 1004 within the cassette 726 and within any additional cassette 726s which may be present at the time or inserted over the course of time.

The system 1000 may also include at least one controller (not shown) for controlling the movement of the holder 400, the gripper 500, the cassette base 702, and any movement along a horizontal and/or vertical track 1008, 1012, 1016. Alternatively, each component or movement may be controlled by individual controllers (not shown). Alternatively, a plurality of components may be controlled by a single controller (not shown) and another plurality of components may be controlled by another controller (not shown). Alternatively, any appropriate combination of controllers (not shown) controlling components may be used, where it is appropriate and desirous to do so.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments are presented by way of examples for purposes of illustration and description. They are not intended to be exhaustive of or to limit this disclosure to the precise forms described. Many modifications and variations are possible in view of the above teachings. The embodiments are shown and described in order to best explain the principles of this disclosure and practical applications, to thereby enable others skilled in the art to best utilize this disclosure and various embodiments with various modifications as are suited to the particular use contemplated. It is intended that the scope of this disclosure be defined by the following claims and their equivalents:

We claim:

1. A system comprising:
   a first cassette comprising at least one slot configured to hold at least one substrate;
   a holder configured to hold the at least one substrate, the holder comprising
      a base comprising a base platform,
      a first arm comprising a proximal end connected to a first end of the base, a distal end extending from the base, two securing blocks, and
      a second arm comprising a proximal end connected to a second end of the base, a distal end extending from the base, a secure bar comprising a securing block, and
      wherein the base platform and the first arm of the holder and the second arm of the holder extend in the same direction from the base; and
   a gripper comprising a first arm, an opposing second arm, a sensor attached to a base, and a crossbar, wherein the crossbar extends at least a portion of a distance between the first arm of the gripper and the second arm of the gripper, and wherein the sensor is proximal to the crossbar.

2. The system of claim 1,
   wherein the first arm of the gripper comprises
      a proximal end connected to a first end of the base,
      a distal end extending from the base,
      two securing brackets, and
   wherein the second arm of the gripper comprises
      a proximal end connected to a second end of the base,
      a distal end extending from the base,
      one securing bracket,
   wherein the first arm of the gripper and the second arm of the gripper extend in the same direction from the base.

3. The system of claim 1, the gripper further comprising a first motor in contact with the second arm of the gripper to move the second arm of the gripper from an open position to a closed position and from the closed position to the open position.

4. The system of claim 1, the gripper further comprising a second motor adjoined to the base or the first arm of the gripper to rotate the base, the first arm of the gripper, and the second arm of the gripper around a longitudinal axis.

5. The system of claim 1, the crossbar extending from the first arm of the gripper to the side of the base of the gripper proximal to the second arm of the gripper.

6. The system of claim 1, wherein the gripper and holder are independently connected to a scanner, a fluorescent microscope, a picking device, a scanner with a picking device, or a fluorescent microscope with a picking device.

7. The system of claim 1, the holder further comprising a motor in contact with the secure bar of the holder to move the secure bar from an open position to a closed position and from the closed position to the open position.

8. The system of claim 1
   wherein the securing block wherein each of the two securing blocks of the first arm of the holder comprises a ramp and a stopper; and
   wherein the second arm of the gripper comprises a secure bar extending from the base and
   at least one securing bracket, wherein the securing bracket comprises a first slanted facet and a second slanted facet thereby forming a notch; and
   wherein the sensor is configured to detect deflection of the crossbar.

\* \* \* \* \*

UNITED STATES PATENT AND TRADEMARK OFFICE
CERTIFICATE OF CORRECTION

PATENT NO.       : 10,802,260 B2
APPLICATION NO.  : 15/601687
DATED            : October 13, 2020
INVENTOR(S)      : Steve Quarre et al.

Page 1 of 1

It is certified that error appears in the above-identified patent and that said Letters Patent is hereby corrected as shown below:

On the Title Page

Item (60), after the first line "Provisional application No. 62/451,272, filed on Jan. 27, 2017," insert --provisional application No. 62/485,500, filed on April 14, 2017,--.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*